(12) United States Patent
Jung et al.

(10) Patent No.: US 12,173,446 B2
(45) Date of Patent: Dec. 24, 2024

(54) LAUNDRY TREATING APPARATUS

(71) Applicant: LG Electronics Inc., Seoul (KR)

(72) Inventors: Youngho Jung, Seoul (KR); Donghyun Jin, Seoul (KR); Minsu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/192,166

(22) Filed: Mar. 4, 2021

(65) Prior Publication Data

US 2021/0277580 A1   Sep. 9, 2021

(30) Foreign Application Priority Data

Mar. 4, 2020   (KR) .................. 10-2020-0027210
Oct. 13, 2020  (KR) .................. 10-2020-0131836

(51) Int. Cl.
*D06F 39/12* (2006.01)
*D06F 23/02* (2006.01)
(Continued)

(52) U.S. Cl.
CPC ............ *D06F 39/125* (2013.01); *D06F 23/02* (2013.01); *D06F 29/005* (2013.01); *D06F 34/34* (2020.02); *D06F 58/02* (2013.01); *F16B 5/0208* (2013.01)

(58) Field of Classification Search
CPC ........ D06F 39/12; D06F 39/125; D06F 34/34; D06F 29/005; D06F 58/02; D06F 31/00
See application file for complete search history.

(56) References Cited

U.S. PATENT DOCUMENTS

2009/0145176 A1   6/2009   Kim et al.
2014/0053612 A1*  2/2014   Son ..................... D06F 29/00
                                                              68/28
(Continued)

FOREIGN PATENT DOCUMENTS

CN    1683667      10/2005
CN    102605586    7/2012
(Continued)

OTHER PUBLICATIONS

Extended European Search Report in European Appln. No. 21157577.4, dated Jul. 16, 2021, 11 pages.
(Continued)

*Primary Examiner* — Joseph L. Perrin
(74) *Attorney, Agent, or Firm* — Fish & Richardson P.C.

(57) ABSTRACT

A laundry treating apparatus is disclosed. The laundry treating apparatus includes a first treating apparatus having a first front panel disposed on a front face thereof, first side panels respectively disposed on both lateral sides in a lateral direction thereof, and a first drum disposed therein for accommodating laundry therein, and a second treating apparatus disposed beneath the first treating apparatus to support the first treating apparatus, wherein the second treating apparatus has a second front panel disposed on a front face thereof, second side panels respectively disposed on both side faces in the left and right direction thereof, and a second drum disposed therein for accommodating the laundry therein. An upper end of the second front panel is located at a vertical level higher than a vertical level of upper ends of the second side panels to rearwardly support lower portions of the first side panels.

24 Claims, 18 Drawing Sheets

(51) Int. Cl.
  *D06F 29/00*    (2006.01)
  *D06F 34/34*    (2020.01)
  *D06F 58/02*    (2006.01)
  *F16B 5/02*    (2006.01)

(56) References Cited

U.S. PATENT DOCUMENTS

| | | | | |
|---|---|---|---|---|
| 2014/0157673 | A1* | 6/2014 | Bazzinotti | D06F 31/00 |
| | | | | 49/70 |
| 2016/0215432 | A1 | 7/2016 | Kim | |
| 2018/0179682 | A1* | 6/2018 | Kim | D06F 37/06 |
| 2018/0179685 | A1* | 6/2018 | Kwon | D06F 37/22 |
| 2018/0179687 | A1* | 6/2018 | Chun | D06F 39/001 |
| 2018/0179689 | A1* | 6/2018 | Kang | D06F 34/28 |
| 2018/0179691 | A1* | 6/2018 | Lee | D06F 31/00 |
| 2018/0258576 | A1* | 9/2018 | Kim | D06F 33/00 |
| 2019/0071809 | A1* | 3/2019 | Chun | D06F 23/06 |
| 2019/0276963 | A1 | 9/2019 | Chae et al. | |

FOREIGN PATENT DOCUMENTS

| | | |
|---|---|---|
| CN | 203741597 | 7/2014 |
| CN | 203785280 | 8/2014 |
| CN | 106149276 | 11/2016 |
| CN | 107338613 | 11/2017 |
| CN | 207313949 | 5/2018 |
| CN | 208562858 | 3/2019 |
| CN | 106637801 | 9/2019 |
| DE | 102021201485 | 8/2021 |
| EP | 2703536 | 3/2014 |
| EP | 3339498 | 6/2018 |
| EP | 3521501 | 8/2019 |
| KR | 20060089083 | 8/2006 |
| KR | 100652459 | 12/2006 |
| KR | 10-2008-0021921 | 3/2008 |
| KR | 20080021921 | 3/2008 |
| KR | 20130027926 | 3/2013 |
| KR | 20180074489 | 7/2018 |
| RU | 2098531 | 12/1997 |
| RU | 2602967 | 11/2016 |
| WO | WO2008069607 | 6/2008 |
| WO | WO2019149246 | 8/2019 |

OTHER PUBLICATIONS

Notice of Allowance in Russian Appln. No. 2021105404, dated Aug. 6, 2021, 12 pages (English translation).
Office Action in Japanese Appln. No. 2021-027015, dated Apr. 19, 2022, 12 pages (with English translation).
Office Action in Chinese Appln. No. 202110202721.0, dated Nov. 18, 2022, 19 pages (with English translation).
EP Communication Pursuant to Article 94(3) EPC in European Appln No. 21157577.4, dated Jun. 29, 2023, 8 pages.
Office Action in Chinese Appln. No. 202110202721.0, dated Aug. 8, 2023, 19 pages (with English translation).

\* cited by examiner

LAUNDRY TREATING APPARATUS

CROSS-REFERENCE TO RELATED APPLICATIONS

This application claims the benefit of Korean Patent Applications Nos. 10-2020-0027210, filed on Mar. 4, 2020, and 10-2020-0131836, filed on Oct. 13, 2020, the disclosures of which are hereby incorporated by reference as if fully set forth herein.

TECHNICAL FIELD

The present disclosure relates to a laundry treating apparatus, and relates to a laundry treating apparatus including one treating apparatus on an upper side and another treating apparatus on a lower side.

BACKGROUND

A laundry treating apparatus is an apparatus that receives laundry such as clothes, bedding, and the like in a drum to perform treatment necessary for the laundry, such as to remove contamination from the laundry or to dry the laundry.

When a laundry treating apparatus is designed to remove the contamination from the laundry, the laundry treating apparatus may perform processes such as washing, rinsing, dehydration, drying, and the like. The laundry treating apparatus may be a top loading type laundry treating apparatus or a front loading type laundry treating apparatus based on a scheme of putting the laundry into the drum.

The laundry treating apparatus may include a cabinet forming an appearance of the laundry treating apparatus, a tub accommodated in the cabinet, a drum that is rotatably mounted inside the tub and into which the laundry is put, and a detergent feeder that feeds detergent into the drum.

When the drum is rotated by a motor while wash water is supplied to the laundry accommodated in the drum, dirt on the laundry may be removed by friction with the drum and the wash water.

The detergent feeder provides a detergent feeding function to improve a washing effect. Herein, the detergent includes a substance, such as fabric detergent, fabric softener, fabric bleach, and the like, that may enhance the washing effect. Detergent in a powder form and detergent in a liquid form may be used as the detergent.

In one example, when a laundry treating apparatus is designed to dry the laundry, the laundry treating apparatus may remove moisture from the laundry by supplying dry air to the laundry.

The laundry treating apparatus may include a cabinet, a drum rotatably disposed inside the cabinet, heating means for heating or drying the air supplied to the laundry, and the like.

As the dry air is supplied to the laundry accommodated in the drum, the moisture present in the laundry may be evaporated and removed by the dry air, and water may be removed from the laundry.

An example laundry treating apparatus or system includes a plurality of treating apparatuses together. For example, the laundry treating apparatus has a first treating apparatus on an upper side and a second treating apparatus on a lower side.

In this laundry treating apparatus, the first treating apparatus and the second treating apparatus may be heavy. In an installation process, the first treating apparatus may be lifted on and be assembled with the second treating apparatus.

However, in the assembly process of lifting the first treating apparatus on top of the second treating apparatus, it may be difficult to determine whether the first treating apparatus is disposed at an appropriate assembly position on the second treating apparatus. When the first treating apparatus is not disposed at the appropriate assembly position, this may adversely affect the stacking structure and assembly stability of the first treating apparatus and the second treating apparatus.

Furthermore, because the first treating apparatus is heavy, it may be a great burden in an assembly work to identify the optimum assembly position and dispose the first treating apparatus while arbitrarily moving the first treating apparatus.

Even when the first treating apparatus is seated at the optimal assembly position, inconvenience in use may occur due to a change in the position of the first treating apparatus if the first treating apparatus is not stably fixed at the corresponding position.

Accordingly, it is desired to provide a treating apparatus or system that allows easily identifying an optimum assembly position of a treating apparatus on another treating apparatus and stably fixing and supporting the treating apparatus at the optimum assembly position.

SUMMARY

Embodiments of the present disclosure are intended to provide a laundry treating apparatus in which optimal disposition of a first treating apparatus on a second treating apparatus may be effectively achieved.

In addition, embodiments of the present disclosure are intended to provide a laundry treating apparatus in which a first treating apparatus may be stably fixed and supported on a second treating apparatus.

In addition, embodiments of the present disclosure are intended to provide a laundry treating apparatus in which a first treating apparatus and a second treating apparatus may be efficiently coupled to each other and structural stability may be effectively improved.

A laundry treating apparatus according to an embodiment of the present disclosure may include a plurality of treating apparatuses. The first treating apparatus may dry laundry, and the second treating apparatus may wash the laundry.

The first treating apparatus and the second treating apparatus may provide a structure in which portions of the first and second treating apparatuses are stacked together in a vertical direction. That is, the first treating apparatus may be disposed on the second treating apparatus.

Each of the first treating apparatus and the second treating apparatus has a drum and a laundry inlet through which the laundry is inserted into the drum. The laundry inlet can be defined at a front face of each of the first and second treating apparatuses. Each drum is configured for accommodating therein the laundry that is inserted through each laundry inlet. The drum may be in a front loader form such that a rotation axis direction of the drum is parallel to a front and rear direction.

A control panel that is operationally or electrically connected to the first treating apparatus and the second treating apparatus may be disposed between the first treating apparatus and the second treating apparatus. The control panel may form a portion of a front face of the laundry treating apparatus. For example, the control panel may be disposed between a first front panel of the first treating apparatus and a second front panel of the second treating apparatus, so that a front face of the control panel may be exposed forward.

In an embodiment of the present disclosure, the first treating apparatus and the second treating apparatus can be controlled through one control panel. The control panel may include a display for displaying operating states of the first treating apparatus and the second treating apparatus, and a manipulation unit for a user to control the first treating apparatus and the second treating apparatus.

In one example, the control panel may be fixed by being coupled to a lower frame disposed on a lower portion of the first treating apparatus. The lower frame may stably fix the control panel. For example, the lower frame includes an upper end extension that supports a bottom of the first front panel, and side end extensions that are respectively coupled to side faces of the control panel.

Such a laundry treating apparatus according to an embodiment of the present disclosure includes a first treating apparatus having a first front panel disposed on a front face thereof and a first drum disposed therein for accommodating laundry therein, and a second treating apparatus disposed beneath the first treating apparatus to support the first treating apparatus. The second treating apparatus has a second front panel disposed on a front face thereof and a second drum disposed therein for accommodating the laundry therein.

In one example, the second front panel of the second treating apparatus may be constructed to protrude upward of the second treating apparatus, and the first treating apparatus may contact an upper end of the second front panel at a front side thereof.

Accordingly, in a process of placing the first treating apparatus on the second treating apparatus, the first treating apparatus may be effectively disposed at an optimum assembly position for coupling with the second treating apparatus, and a movement of the first treating apparatus in a forward direction may be restricted by the upper end of the second front panel, thereby realizing a stable fixing structure of the first treating apparatus.

In addition, in an embodiment of the present disclosure, as the upper end of the second front panel is constructed to form a portion of the front face of the first treating apparatus, the coupling structure of the first treating apparatus and the second treating apparatus may be stably realized, and integration in an appearance may be achieved, thereby improving a user's feeling in using the apparatus.

Particular implementations of the present disclosure provide a laundry treating system that includes first and second treating apparatuses. The first treating apparatus may include a first front panel and first side panels. The first treating apparatus may include a first drum configured to accommodate first laundry therein. The second treating apparatus may be disposed beneath the first treating apparatus and support the first treating apparatus. The second treating apparatus may include a second front panel and second side panels. The second treating apparatus may include a second drum configured to accommodate second laundry therein. An upper end of the second front panel is positioned to be vertically higher than upper ends of the second side panels. The upper end of the second front panel contacts lower portions of the first side panels.

In some implementations, the system can optionally include one or more of the following features. The second front panel may include a front face, and lateral bending portions extending rearward from opposite lateral ends of the front face. Front ends of the first side panels may be vertically aligned with front ends of the second side panels. The lateral bending portion of the second front panel may contact the front ends of the first side panels and the front ends of the second side panels together. The laundry treating system may include a control panel positioned between the first front panel and the second front panel. The control panel may be configured to communicate with the first treating apparatus and the second treating apparatus. The second front panel may include an upper bending portion extending rearward from an upper end of a front face of the second front panel. The upper bending portion of the second front panel may be located to be vertically higher than the upper ends of the second side panels. The upper bending portion of the second front panel may support a lower portion of the control panel. The control panel may include a bottom face facing toward the upper bending portion of the second front panel. The control panel may further include a panel fastening portion protruding downward from the bottom face of the control panel and extending through the upper bending portion of the second front panel to thereby coupling the bottom face of the control panel to the upper bending portion of the second front panel. The second front panel may include an upper bending portion extending rearward from an upper end of a front face of the second front panel, and an upper fastening portion extending upward from the upper bending portion and coupled to the first treating apparatus. The upper bending portion of the second front panel may include a first portion that is integral with the front face of the second front panel and curved rearward from the front face of the second front panel. The upper fastening portion of the second front panel may include a second portion that is integral with a rear end of the upper bending portion and curved upward from the rear end of the upper bending portion. Each of the first side panels may include a side face, and a front bending portion extending perpendicularly from a front end of the side face. The upper fastening portion of the second front panel may be coupled to the front bending portion of each of the first side panels. The second treating apparatus may include an upper frame that is disposed between the second front panel and the second side panels and coupled to the second side panels. An upper end of the upper frame of the second treating apparatus may be located to be vertically higher than the second side panels. The upper end of the upper frame may be coupled to the front bending portion of each of the first side panels and the upper fastening portion of the second front panel. The laundry treating system may include an insulating connection member at least partially disposed between the upper frame of the second treating apparatus and the front bending portion each of the first side panels. The insulating connection member may be configured to insulate the upper frame of the second treating apparatus and the upper fastening portion of the second front panel from the front bending portion each of the first side panels. The upper fastening portion of the second front panel, the upper frame of the second treating apparatus, the insulating connection member, and the front bending portion of each of the first side panels may be positioned to at least partially overlap with each other to provide a stacked structure. The laundry treating system may include a fastening member that penetrates the stacked structure from the upper fastening portion of the second front panel to the front bending portion of each of the first side panels to thereby fix the upper fastening portion of the second front panel to the front bending portion of each of the first side panels. The first treating apparatus may include a lower frame that is spaced apart from (i) the upper fastening portion of the second front panel and (ii) the upper frame of the second treating apparatus. The lower frame may be coupled to the front bending portion of each of the first side panels. The lower frame may be disposed behind the control panel and coupled to the control panel. The control panel includes a control panel front face. The upper fastening portion of the second front panel may be located behind the control panel front face and coupled to the first treating apparatus.

Particular implementations of the present disclosure provide a laundry treating system that includes first and second treating apparatuses. The first treating apparatus may include a first front panel and first side panels, and include a first drum configured to accommodate first laundry therein. The second treating apparatus may be disposed beneath the first treating apparatus and support the first treating apparatus. The second treating apparatus may include a second front panel and second side panels, and include a second drum configured to accommodate second laundry therein. An upper end of the second front panel may be located to be vertically higher than upper ends of the second side panels.

In some implementations, the system can optionally include one or more of the following features. A vertical length of the second front panel may be greater than vertical lengths of the second side panels. The second treating apparatus may include an upper frame having (i) a frame lower end that is disposed between the second front panel and the second side panels and (ii) a frame upper end protruding upward from the second side panels. The upper frame of the second treating apparatus may be coupled to the first treating apparatus. The second treating apparatus may include an upper fastening portion that is disposed at the upper end of the second front panel and coupled to the first treating apparatus. The upper fastening portion may be disposed to cover the upper frame of the second treating apparatus and may be coupled to the first treating apparatus and the upper frame of the second treating apparatus. A lower end of the first front panel may be located to be vertically higher than lower ends of the first side panels. The upper end of the second front panel may be located in front of the first side panels.

Particular implementations of the present disclosure provide a laundry treating system that includes first and second treating apparatuses. The first treating apparatus may include a first front panel and first side panels, and include a first drum configured to accommodate first laundry therein. The second treating apparatus may be disposed beneath the first treating apparatus and support the first treating apparatus. The second treating apparatus may include a second front panel and second side panels, and include a second drum configured to accommodate second laundry therein. A lower end of the first front panel may be located to be vertically higher than lower ends of the first side panels.

In some implementations, the system can optionally include one or more of the following features. A vertical length of the first front panel may be smaller than vertical lengths of the first side panels. An upper end of the second front panel may be located in front of the first side panels.

In an aspect of the present disclosure, a laundry treating apparatus includes a first treating apparatus and a second treating apparatus. The first treating apparatus has a first front panel disposed on a front face thereof, first side panels respectively disposed on both lateral sides in a lateral direction thereof, and a first drum disposed therein for accommodating laundry therein.

In one implementation, a second treating apparatus may be disposed beneath the first treating apparatus to support the first treating apparatus, and the second treating apparatus may have a second front panel disposed on a front face thereof, second side panels respectively disposed on both side faces in the left and right direction thereof, and a second drum disposed therein for accommodating the laundry therein.

In one implementation, an upper end of the second front panel may be located at a vertical level higher than a vertical level of upper ends of the second side panels to rearwardly support lower portions of the first side panels.

In one implementation, the second front panel may include a front face exposed forward of the second treating apparatus, and lateral bending portions respectively extending rearward from both ends in the left and right direction of the front face.

In one implementation, upper ends of the lateral bending portions may be located at a vertical level higher than the vertical level of the upper ends of the second side panels to rearwardly support the first side panels.

In one implementation, a front end of the first side panel and a front end of the second side panel may be arranged side by side in a vertical direction, and each lateral bending portion may be in contact with the front end of each first side panel and the front end of each second side panel together.

In one implementation, the laundry treating apparatus may further include a control panel inserted between the first front panel and the second front panel. The control panel is operationally or electrically connected to the first treating apparatus and the second treating apparatus.

In one implementation, the second front panel may further include an upper bending portion extending rearward from an upper end of a front face thereof, and the upper bending portion may be located at a vertical level higher than the vertical level of the upper ends of the second side panels to support a lower portion of the control panel.

In one implementation, the upper bending portion may be formed by being bent rearward from the upper end of the second front panel.

In one implementation, the control panel may include a bottom face facing toward the upper bending portion, and the upper bending portion may be fastened with the bottom face.

In one implementation, a panel fastening portion protruding downward may be disposed on the bottom face of the control panel, and the bottom face may be coupled to the upper bending portion as the panel fastening portion penetrates the upper bending portion.

In one implementation, the second front panel may further include an upper fastening portion extending upward from the upper bending portion and coupled to the first treating apparatus. The upper fastening portion may extend upward from a rear end of the upper bending portion.

In one implementation, the upper fastening portion may be formed by being bent from the rear end of the upper bending portion. Both sides in the left and right direction of the upper fastening portion may be respectively fastened to the first side panels respectively facing thereto.

In one implementation, each first side panel may include a side face exposed in the left and right direction of the first treating apparatus, and a front bending portion extending in the left and right direction from a front end of the side face, and the upper fastening portion may be coupled to the front bending portion.

In one implementation, the second treating apparatus may include an upper frame disposed between the second front panel and the second side panel and coupled to the second side panel. An upper end of the upper frame located at a vertical level higher than the vertical level of the second side panel is coupled to the front bending portion together with the upper fastening portion.

In one implementation, the laundry treating apparatus may further include an insulating connection member disposed between the upper frame and the front bending portion to insulate the upper frame and the upper fastening portion from the front bending portion.

In one implementation, the upper fastening portion, the upper frame, the insulating connection member, and the front bending portion may be stacked in order to form a stacked structure, and the laundry treating apparatus may further include a fastening member penetrating the stacked structure from the upper fastening portion to the front bending portion to fix the upper fastening portion.

In one implementation, the first treating apparatus may further include a lower frame spaced apart from the upper fastening portion and the upper frame and coupled to the front bending portion. The lower frame may be disposed at the rear of the control panel to be coupled to the control panel.

In one implementation, the control panel may include a front face exposed forward, and the upper fastening portion may be located at the rear of the front face and coupled to the first treating apparatus. The front face of the control panel may be located side by side with the front face of the second front panel in the vertical direction.

In one implementation, the control panel may include a bottom face extending rearward from a lower end of the front face, and the bottom face may extend such that a rear end thereof is positioned in front of the upper fastening portion.

In one implementation, the control panel may include side faces respectively extending rearward from both ends in the left and right direction of the front face, and the side face may extend such that a rear end thereof is located at the rear of the bottom face, so that the side face may face toward the first side panel.

In one implementation, the first treating apparatus may include a first rear panel disposed on a rear face thereof, the second treating apparatus may include a second rear panel disposed on a rear face thereof, and a rear bracket coupled to the first rear panel and the second rear panel to forwardly support the first rear panel may be further included.

In one implementation, the first rear panel may be positioned forward of the second rear panel, and the rear bracket may have a stepped shape such that an upper portion of a front face thereof is positioned forward of a lower portion of the front face, and may forwardly support the first rear panel.

In another aspect of the present disclosure, a laundry treating apparatus includes first and second treating apparatuses and a control panel. The first treating apparatus has a first front panel disposed on a front face thereof, first side panels respectively disposed on both lateral sides in a lateral direction thereof, and a first drum disposed therein for accommodating laundry therein. The second treating apparatus is disposed beneath the first treating apparatus to support the first treating apparatus. The second treating apparatus has a second front panel disposed on a front face thereof, second side panels respectively disposed on both side faces in the left and right direction thereof, and a second drum disposed therein for accommodating the laundry therein. The control panel is inserted between the first front panel and the second front panel. The control panel is operationally or electrically connected to the first treating apparatus and the second treating apparatus. An upper end of the second front panel is located in front of the first side panels to rearwardly support the first side panels.

In one implementation, a rear bracket disposed at the rear of the second treating apparatus to forwardly support the first treating apparatus may be further included, and the first treating apparatus may be fixed in a front and rear direction by the second front panel and the rear bracket.

In one implementation, in a laundry treating apparatus, a first treating apparatus has a first front panel disposed on a front face thereof, first side panels respectively disposed on both lateral sides in a lateral direction thereof, and a first drum disposed therein for accommodating laundry therein.

In one implementation, a second treating apparatus may be disposed beneath the first treating apparatus to support the first treating apparatus, and the second treating apparatus may have a second front panel disposed on a front face thereof, second side panels respectively disposed on both side faces in the left and right direction thereof, and a second drum disposed therein for accommodating the laundry therein. In the second treating apparatus, an upper end of the second front panel may be located at a vertical level higher than a vertical level of upper ends of the second side panels.

In one implementation, in the second treating apparatus, a length in a vertical direction of the second front panel may be larger than a length in the vertical direction of the second side panel.

In one implementation, the second treating apparatus may further include an upper frame, and the upper frame may have a lower end disposed between the second front panel and the second side panel and an upper end protruding upward of the second side panel. In the second treating apparatus, the upper frame may be coupled to the first treating apparatus.

In one implementation, the second treating apparatus may include an upper fastening portion disposed at the upper end of the second front panel and coupled to the first treating apparatus, and the upper fastening portion may be disposed to cover the upper frame from the front and be coupled to the first treating apparatus together with the upper frame.

In one implementation, a lower end of the first front panel may be located at a vertical level higher than a vertical level of lower ends of the first side panels, and the upper end of the second front panel may be located in front of the first side panels.

In another aspect of the present disclosure, a first treating apparatus has a first front panel disposed on a front face thereof, first side panels respectively disposed on both lateral sides in a lateral direction thereof, and a first drum disposed therein for accommodating laundry therein.

In one implementation, a second treating apparatus may be disposed beneath the first treating apparatus to support the first treating apparatus, and the second treating apparatus may have a second front panel disposed on a front face thereof, second side panels respectively disposed on both side faces in the left and right direction thereof, and a second drum disposed therein for accommodating the laundry therein. A lower end of the first front panel may be located at a vertical level higher than a vertical level of lower ends of the first side panels.

In one implementation, a length in a vertical direction of the first front panel may be smaller than a length in the vertical direction of the first side panel. An upper end of the second front panel may be located in front of the first side panels.

In one implementation, a control panel disposed between the first front panel and the second front panel, positioned in front of the first side panels, and operationally or electrically connected to the first treating apparatus and the second treating apparatus may be further included.

In one implementation, the first treating apparatus may include a lower frame, and the lower frame may be located beneath the first front panel, located in front of the first side panel, and coupled to the control panel at the rear of the control panel.

In another aspect of the present disclosure, a first treating apparatus has a first front panel disposed on a front face thereof, and a first drum disposed therein for accommodating laundry therein. A second treating apparatus is disposed beneath the first treating apparatus to support the first treating apparatus, and the second treating apparatus has a second front panel disposed on a front face thereof, and a second drum disposed therein for accommodating the laundry therein.

In one implementation, a length in a vertical direction of the second front panel may be larger than a length in the vertical direction of the first front panel.

In one implementation, the first treating apparatus may include first side panels respectively disposed on both lateral sides in a lateral direction thereof, and the length in the vertical direction of the first front panel may be smaller than a length in the vertical direction of the first side panel.

In one implementation, an upper end of the second front panel may be located at a vertical level higher than a vertical level of upper ends of the second side panels to be coupled to the first treating apparatus.

In another aspect of the present disclosure, a laundry treating apparatus includes a first treating apparatus having a first cabinet for forming an appearance of the first treating apparatus and a first drum disposed inside the first cabinet. The first drum accommodates laundry therein.

In one implementation, a second treating apparatus may have a second cabinet for forming an appearance of the second treating apparatus and a second drum disposed inside the second cabinet. The second drum accommodates the laundry therein. One face of the second cabinet may protrude upward of an opposite face to said one face, so that the second cabinet may be coupled to the first cabinet.

In one implementation, a front face of the second cabinet may protrude upward of side faces of the second cabinet to be located at a front side of the first cabinet.

In one implementation, the second cabinet may include a second front panel and second side panels, the second front panel may form the front face of the second cabinet, and the second side panels may respectively form the both side faces of the second cabinet.

In one implementation, an upper end of the second front panel may be located at a vertical level higher than a vertical level of upper ends of the second side panels to be located at the front side of the first cabinet.

Embodiments of the present disclosure may provide the laundry treating apparatus in which the optimal disposition of the first treating apparatus may be effectively achieved on the second treating apparatus.

In addition, embodiments of the present disclosure may provide the laundry treating apparatus in which the first treating apparatus may be stably fixed and supported on the second treating apparatus.

In addition, embodiments of the present disclosure may provide the laundry treating apparatus in which the first treating apparatus and the second treating apparatus may be efficiently coupled to each other and the structural stability may be effectively improved.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
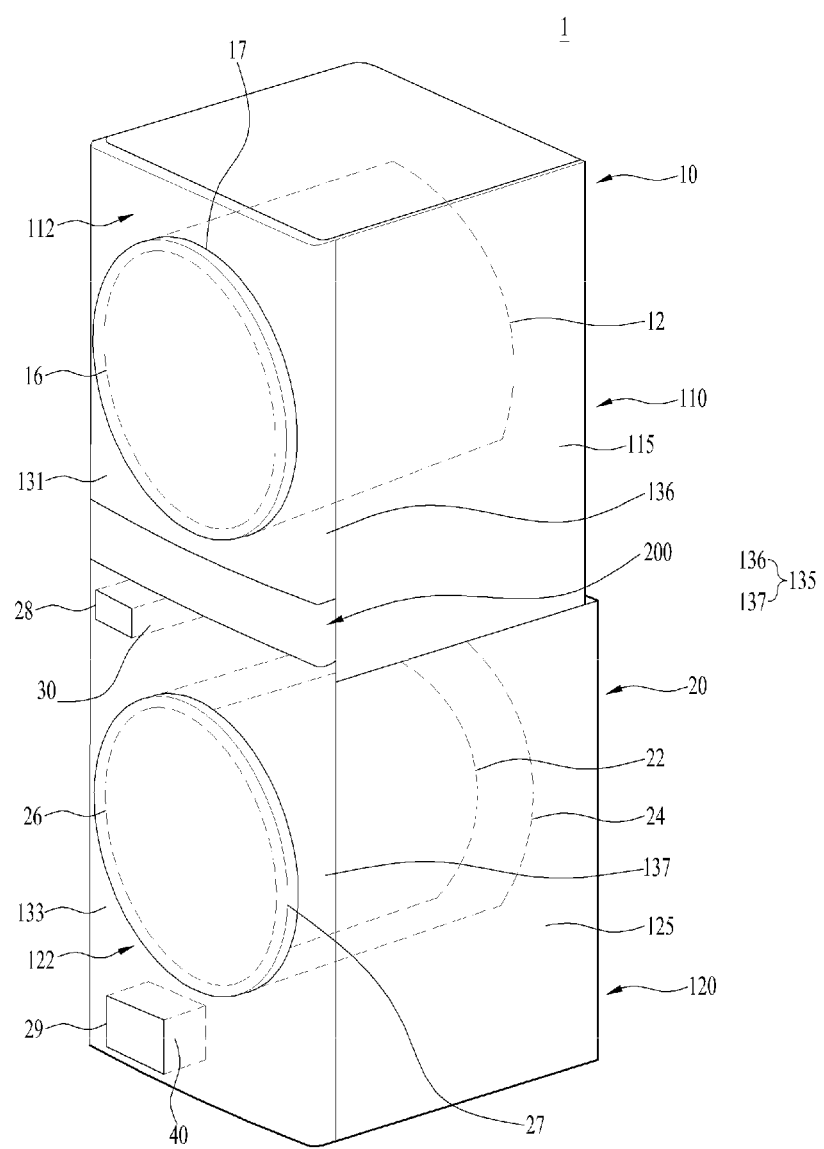
FIG. 1 is a perspective view showing a laundry treating apparatus according to an embodiment of the present disclosure.

Hereinafter, an embodiment of the present disclosure will be described in detail with reference to the accompanying drawings such that a person having ordinary knowledge in the technical field to which the present disclosure belongs may easily implement the embodiment.

It is understood that the present disclosure is able to be implemented in various different forms and is not limited to the embodiment described herein. In addition, in order to clearly describe the present disclosure, known components may be omitted in the drawings. Further, similar reference numerals may be used for similar components throughout the specification.

Duplicate descriptions of the same components may be omitted herein.

FIG. 1 shows a laundry treating apparatus 1 according to an embodiment of the present disclosure. In an embodiment of the present disclosure, the laundry treating apparatus (or system) 1 includes a first treating apparatus 10 and a second treating apparatus 20. The first treating apparatus 10 and the second treating apparatus 20 may be in various types for treating laundry, such as a washing machine for washing the laundry or a dryer for drying the laundry.

For example, the first treating apparatus 10 positioned on an upper side in FIG. 1 is a dryer for drying the laundry, which may include a first drum 12 that is disposed in the dryer and configured to accommodate the laundry therein. The second treating apparatus 20, which is located on a lower side and supports the first treating apparatus 10, may be a washing machine for washing the laundry, and may include a second drum 22 in which the laundry is accommodated, and a tub 24 arranged therein. When the second treating apparatus 20 is a washing machine, the second drum 22 inside the second treating apparatus 20 may be rotatably disposed inside the tub 24.

However, in some embodiments of the present disclosure, the first treating apparatus 10 and the second treating apparatus 20 are not necessarily limited to the above types. In some implementations, both the first treating apparatus 10 and the second treating apparatus 20 may be the washing machines or the dryers. In other implementations, the first treating apparatus 10 may be the washing machine, and the second treating apparatus 20 may be the dryer. The first treating apparatus 10 and the second treating apparatus 20 may be various apparatuses for treating the laundry.

The first treating apparatus 10 may include a first cabinet 110 forming an appearance thereof, and the first cabinet 110 may have a first front panel 112 on a front face thereof. A laundry inlet in communication with the first drum 12 may be defined in the first front panel 112, and the laundry inlet may be opened and closed by a cabinet door.

In addition, the first treating apparatus 10 may include first side panels 115 respectively disposed on both side faces thereof in a left and right direction Y (FIG. 2), may include a first rear panel 118 disposed on a rear face thereof, may include a first top panel disposed on a top face thereof, and may include a first bottom panel disposed on a bottom face thereof.

Figure 2:
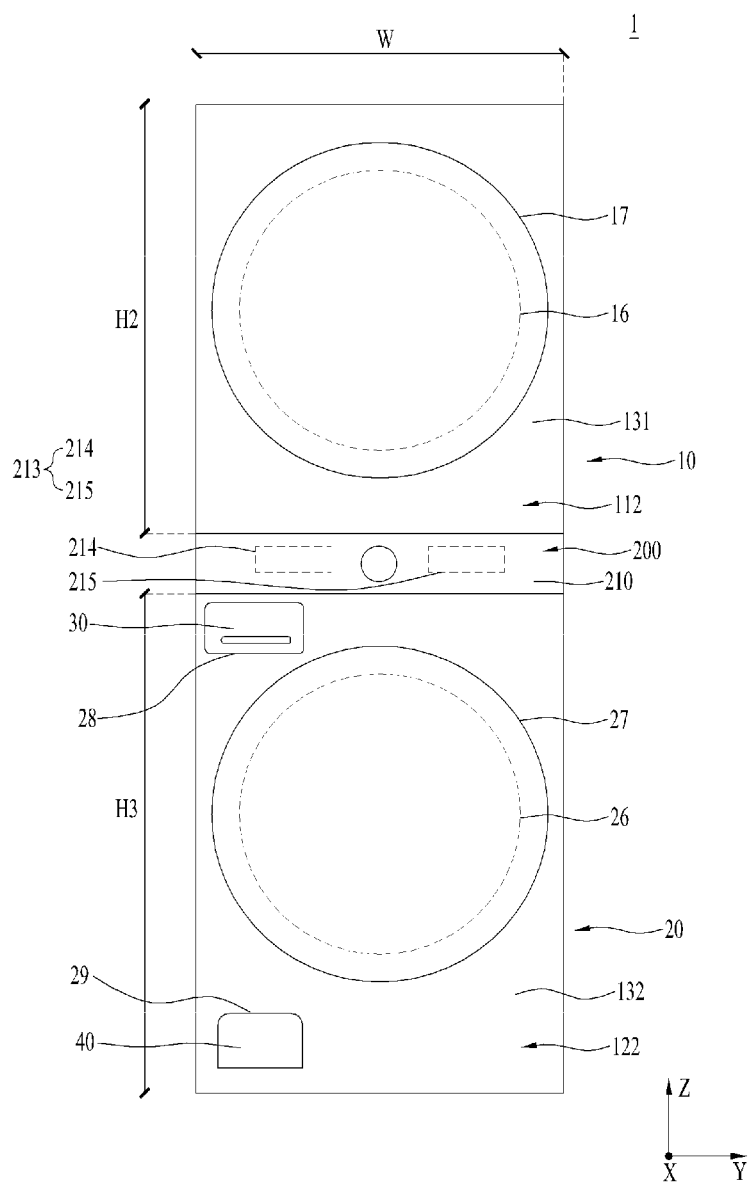
FIG. 2 is a front view showing a laundry treating apparatus according to an embodiment of the present disclosure.

In the present disclosure, as shown in FIG. 2, the components may have the front and rear directions X parallel to each other, the left and right directions Y parallel to each other, and the vertical directions Z. For example, the front and rear direction X of the first treating apparatus 10 may be defined identically to the front and rear directions X of the second treating apparatus 20, the control panel 200, a lower frame 300, and the like. In addition, the left and right directions Y and the vertical directions Z may also be defined as in the above scheme.

The first front panel 112, the first side panels 115, the first rear panel 118, the first top panel, and the first bottom panel may form the first cabinet 110 together, may have a coupling relationship with each other, and may define a space in which internals constituting the first treating apparatus 10 like the first drum 12 are arranged.

In the first treating apparatus 10, the laundry requiring the treatment and the like may be inserted into the first cabinet 110 through the laundry inlet and accommodated in the first drum 12, and a treating process by the first treating apparatus 10 such as washing, drying, and the like may be performed.

According to an embodiment of the present disclosure, FIG. 1 illustrates the first treating apparatus 10 in which the laundry inlet is defined in the first front panel 112 along with the cabinet door, and the first drum 12 has a rotation axis parallel to a front and rear direction X.

However, the laundry inlet may not be necessarily limited to being defined in the first front panel 112, and may be defined in the first side panel 115, the first top panel, or the like together with the cabinet door. For example, the first treating apparatus 10 may be a front loader type or a top loader type.

In one example, the second treating apparatus 20 may include a second cabinet 120 forming an appearance thereof, and the second cabinet 120 may have a second front panel 122 on a front face thereof. A laundry inlet in communication with the second drum 22 may be defined in the second front panel 122, and the laundry inlet may be opened and closed by a cabinet door.

In addition, the second treating apparatus 20 may have a second side panel 125 on each of both faces thereof in the left and right direction Y, a second rear panel 128 on a rear face thereof, a second top panel on a top face thereof, and a second bottom panel on a bottom face thereof.

The second front panel 122, the second side panels 125, the second rear panel 128, the second top panel, and the second bottom panel may form the second cabinet 120 together, and have a coupling relationship with each other, and define a space in which internals constituting the second treating apparatus 20 such as the second drum 22 and the tub 24 are arranged.

In the second treating apparatus 20, the laundry requiring the treatment and the like may be inserted into the second cabinet 120 through the laundry inlet and accommodated in the second drum 22, and a treating process by the second treating apparatus 20 such as the washing, the drying, and the like may be performed.

According to an embodiment of the present disclosure, FIG. 1 illustrates the second treating apparatus 20 in which the laundry inlet is defined in the second front panel 122 along with the cabinet door, and the second drum 22 has a rotation axis parallel to the front and rear direction X.

However, the laundry inlet may not be necessarily limited to being defined in the second front panel 122, and may be defined in the second side panel 125, the second top panel, or the like together with the cabinet door. For example, the first treating apparatus 10 may be the front loader type or the top loader type.

For example, the laundry inserted through the first front panel 112 may be accommodated in the first drum 12 to perform the washing, the drying or other treating processes, and the laundry inserted through the second front panel 122 may be accommodated in the second drum 22 to perform the washing, the drying, or other treating processes.

The first treating apparatus 10 may be disposed on the second treating apparatus 20, and thus, the second treating apparatus 20 may have a structure supporting the first treating apparatus 10 upward. For example, the second top panel of the second treating apparatus 20 may have a structure of directly or indirectly supporting the first bottom panel 119 of the first treating apparatus 10, and a bottom of the first treating apparatus 10 may be coupled with a top of the second treating apparatus 20.

In one example, in an embodiment of the present disclosure, each of the first cabinet 110 and the second cabinet 120 may have the front face, the both side faces, the rear face, and the like. In the first cabinet 110, the first front panel 112 may form the front face of the first cabinet 110, the first side panels 115 may form the both side faces of the first cabinet 110, and the first rear panel 118 may form the rear face of the rear face of the first cabinet 110.

In the second cabinet 120, the second front panel 122 may form the front face of the second cabinet 120, the second side panels 125 may form the both side faces of the second cabinet 120, and the second rear panel 128 may form the rear face of the second cabinet 120.

In the first cabinet 110, one of a plurality of faces including the front face, the both side faces, the rear face, and the like may have a length in the vertical direction smaller than those of the other faces. That is, said one of the plurality of faces may have a lower end positioned at a vertical level higher than vertical levels of lower ends of the other faces.

One of the plurality of faces of the second cabinet 120 may protrude upward of the other faces of the second cabinet 120. That is, one of the plurality of faces may protrude upward of the other faces. For example, one of the plurality of faces may have an upper end positioned at a vertical level higher than vertical levels of upper ends of the other faces.

That is, one face of each of the first cabinet 110 and the second cabinet 120 may have a length different from lengths of the other faces such that structural interference between the first cabinet 110 and the second cabinet 120 may occur. Therefore, effective coupling between the first cabinet 110 and the second cabinet 120 may be achieved, and arrangement of the first cabinet 110 and the second cabinet 120 may be easily achieved.

For example, in an embodiment of the present disclosure, the front face of the second cabinet 120 may have a length in the vertical direction greater than that of the side face. That is, the second cabinet 120 may be constructed such that the front face, for example, the second front panel 122 protrudes upward of the side face. The front face of the second cabinet 120 protruding upwards may extend to invade a region of the first cabinet 110, thereby acting advantageously for the coupling of the first cabinet 110 and the second cabinet 120 and determination of the position of the first cabinet 110.

Figure 3:
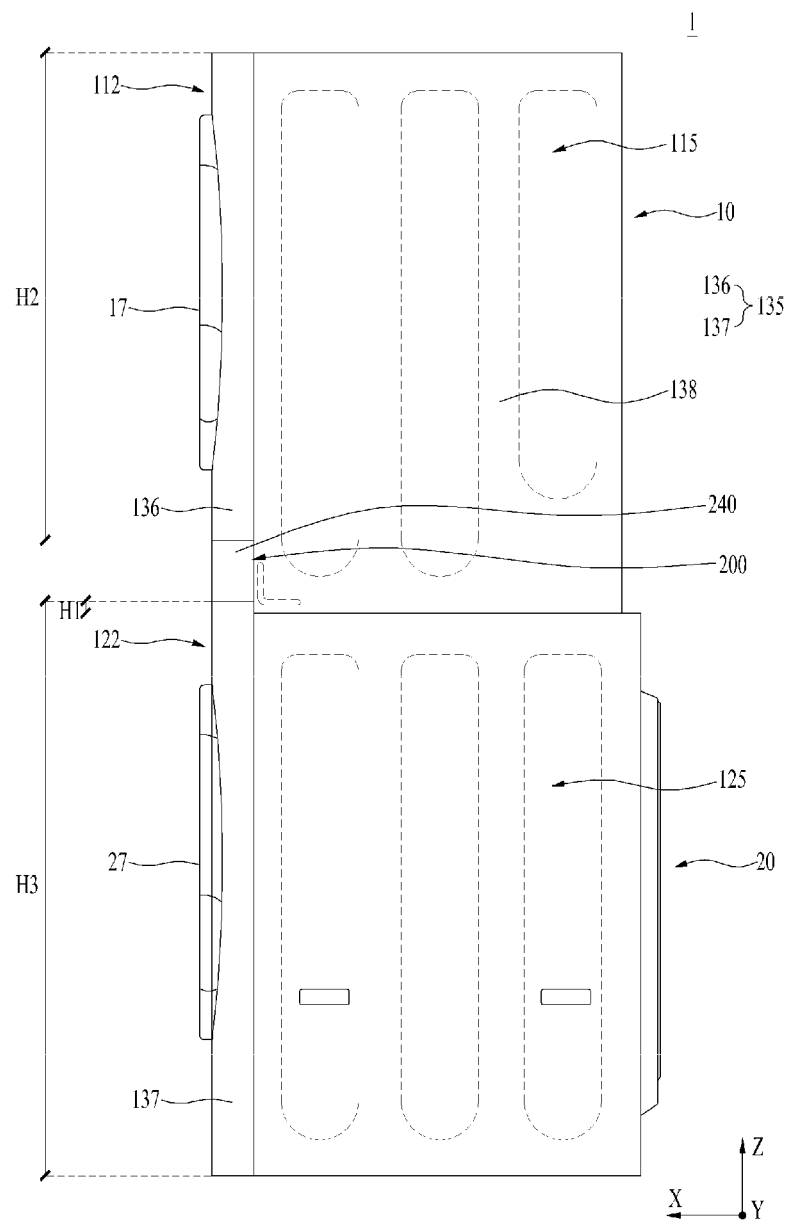
FIG. 3 is a side view showing a laundry treating apparatus according to an embodiment of the present disclosure.

In one example, FIG. 2 shows the laundry treating apparatus 1 shown in FIG. 1 viewed from the front, and FIG. 3 shows the laundry treating apparatus 1 shown in FIG. 1 viewed from the side.

Referring to FIGS. 1 to 2, in the laundry treating apparatus 1 according to an embodiment of the present disclosure, a first laundry inlet 16 that can be opened and closed by a first cabinet door 17 and is in communication with the first drum 12 may be defined in the first front panel 112, and a second laundry inlet 26 that can be opened and closed by a second cabinet door 27 and is in communication with the second drum 22 may be defined in the second front panel 122.

In an embodiment of the present disclosure, the first treating apparatus 10 may include the first laundry inlet 16 and the first cabinet door 17, and the first laundry inlet 16 and the first cabinet door 17 may be respectively defined in and disposed on the first front panel 112. That is, the first treating apparatus 10 may be formed in a front loader shape.

In addition, the second treating apparatus 20 may include the second laundry inlet 26 and the second cabinet door 27, and the second laundry inlet 26 and the second cabinet door 27 may be respectively defined in and disposed on the second front panel 122. That is, the second treating apparatus 20 may be formed in the front loader shape.

As a result, the laundry treating apparatus 1 according to an embodiment of the present disclosure may be constructed in a form in which the first treating apparatus 10 and the second treating apparatus 20 in the form of the front loader are stacked in the vertical direction Z. Cross-sections viewed from the above of the first treating apparatus 10 and the second treating apparatus 20 may be designed to be the same in some implementations, or different from each other in other implementations.

For example, as will be described later, a length of the first treating apparatus 10 in the front and rear direction X may be smaller than a length of the second treating apparatus 20 in the front and rear direction X. A length of the first treating apparatus 10 in the left and right direction Y and a width of the first treating apparatus 10 may be the same as those of the second treating apparatus 20.

Sizes and shapes of the first laundry inlet 16 and the second laundry inlet 26 may be various. FIG. 2 shows a state in which the first laundry inlet 16 and the second laundry inlet 26 are defined in a circular shape and have the same cross-sectional area according to an embodiment of the present disclosure, but the shapes and the cross-sectional areas thereof may be changed as needed.

Sizes and shapes of the first cabinet door 17 and the second cabinet door 27 may also be determined variously to correspond to the sizes and the shapes of the first laundry inlet 16 and the second laundry inlet 26. FIGS. 1 and 2 show the first cabinet door 17 and the second cabinet door 27 having a circular shape and having the same cross-sectional area according to an embodiment of the present disclosure.

The first cabinet door 17 and the second cabinet door 27 may be constructed to open and close the first laundry inlet 16 and the second laundry inlet 26, respectively. That is, the first cabinet door 17 and the second cabinet door 27 may be constructed to regulate the opening of the first laundry inlet 16 and the second laundry inlet 26, respectively.

When the first cabinet door 17 and the second cabinet door 27 respectively open the first laundry inlet 16 and the second laundry inlet 26, the user may put the laundry into the first laundry inlet 16 and the second laundry inlet 26 as needed, and operate the first treating apparatus 10 and the second treating apparatus 20 as needed to perform a desired laundry treatment.

There may be various operating types of the first cabinet door 17 and the second cabinet door 27. For example, the first cabinet door 17 and the second cabinet door 27 may be constructed in a slide form or in a detachable form.

FIGS. 1 and 2 show a state in which one side of each of the first cabinet door 17 and the second cabinet door 27 is hinged to each of the first front panel 112 and the second front panel 122 to open and close each of the first laundry inlet 16 and the second laundry inlet 26, according to an embodiment of the present disclosure.

The first laundry inlet 16 and the second laundry inlet 26 may be defined at centers of the first front panel 112 and the second front panel 122, respectively, but positions of the first laundry inlet 16 and the second laundry inlet 26 may be changed in some implementations. The first laundry inlet 16 and the second laundry inlet 26 may be arranged side by side in the vertical direction Z.

The first cabinet door 17 and the second cabinet door 27 may also be arranged side by side in the vertical direction Z, and may be spaced apart from each other in the vertical direction Z. Areas occupied by the first cabinet door 17 and the second cabinet door 27 in the first front panel 112 and the second front panel 122, respectively, may be variously determined.

As the first laundry inlet 16 and the second laundry inlet 26 are respectively defined in the first front panel 112 and the second front panel 122, even when a total height of the laundry treating apparatus 1 is increased, a user may conveniently use the first treating apparatus 10 and the second treating apparatus 20.

In one example, FIGS. 1 to 2 show a state in which the control panel 200 is installed in the laundry treating apparatus 1 according to an embodiment of the present disclosure. The laundry treating apparatus 1 according to an embodiment of the present disclosure may include a control panel 200 disposed between the first front panel 112 and the second front panel 122, and operationally or electrically connected to the first treating apparatus 10 and the second treating apparatus 20.

The control panel 200 may be disposed between the first front panel 112 and the second front panel 122. The control panel 200 may be operationally or electrically connected to at least one of the first treating apparatus 10 and the second treating apparatus 20.

The control panel 200 may have a front face 210, and side faces 240 respectively disposed on both sides thereof in the left and right direction Y. The side faces 240 may include a first side face 242 disposed on one side in the left and right direction Y and a second side face 244 disposed on the other side.

The control panel 200 may have a top face 220 and a bottom face 230. The front face 210, the side faces 240, the top face 220, and the bottom face 230 may be connected to each other. For example, the side faces 240, the top face 220, and the bottom face 230 may have a shape extending rearward from the front face 210.

The front face 210 of the control panel 200 may be exposed to the outside to form the front face of the laundry treating apparatus 1 according to an embodiment of the present disclosure together with the first front panel 112 and the second front panel 122. The side faces 240 of the control panel 200 may be exposed outside in the left and right direction Y, and the top face 220 and the bottom face 230 may be inserted between the first front panel 112 and the second front panel 122 and may not be exposed to the outside.

The control panel 200 may be operationally or electrically connected to at least one of the first treating apparatus 10 and the second treating apparatus 20. The control panel 200 may include a display 213 capable of indicating states of the first treating apparatus 10 and/or the second treating apparatus 20 disposed on the front face 210, and may include an input unit capable of inputting an operation command of the first treating apparatus 10 and/or the second treating apparatus 20.

Electric parts 224 may be arranged inside the control panel 200, that is, at the rear of the front face 210. The electric parts 224 may be electrically connected to the first treating apparatus 10 and/or the second treating apparatus 20 and may exchange status information or control signals with the first treating apparatus 10 and/or the second treating apparatus 20.

For example, the electric parts 224 may include a controller of the first treating apparatus 10 and a controller of the second treating apparatus 20, may include an integrated controller that controls the first treating apparatus 10 and the second treating apparatus 20 together, may include a panel controller connected to the controller of the first treating apparatus 10 and the controller of the second treating apparatus 20 in a control manner, or may be controlled by the controller of the first treating apparatus 10 and the controller of the second treating apparatus 20 without a separate controller.

The control panel 200 may include a rear face, but in an embodiment of the present disclosure, the rear face of the control panel 200 may be opened. The control panel 200 disposed between the first front panel 112 and the second front panel 122 may be positioned at a lower portion of the first treating apparatus 10 or at an upper portion of the second treating apparatus 20.

The control panel 200 may be disposed between the first laundry inlet 16 and the second laundry inlet 26. That is, in an embodiment of the present disclosure, the control panel 200 may be disposed between the first cabinet door 17 and the second cabinet door 27.

As shown in FIGS. 1 to 2, in an embodiment of the present disclosure, the first front panel 112 and the second front panel 122 may have widths in the left and right direction Y the same as or similar to each other. In addition, the control panel 200 may have the same width as the first front panel 112 and the second front panel 122.

FIG. 2 shows all of the first front panel 112, the second front panel 122, and the control panel 200 having the same width W according to an embodiment of the present disclosure.

As the control panel 200 is constructed to have the same width W as the first front panel 112 and the second front panel 122, an enough internal space for the control panel 200 to be connected to the first treating apparatus 10 and the second treating apparatus 20 may be secured, and spaces may be easily secured for positioning a first display 214 and a second display 215 that can respectively display the states of the first treating apparatus 10 and the second treating apparatus 20.

As will be described later, the control panel 200 together with the first front panel 112 and the second front panel 122 may form a front side appearance of the laundry treating apparatus 1 according to an embodiment of the present disclosure.

In an embodiment of the present disclosure, the control panel 200 is disposed between the first laundry inlet 16 and the second laundry inlet 26, or between the first cabinet door 17 and the second cabinet door 27, or between the first front panel 112 and the second front panel 122, so that a position of the control panel 200 convenient for the user to identify and manipulate the control panel 200 may be secured.

For example, for separate control panels are provided for the first treating apparatus 10 and the second treating apparatus 20 respectively, he control panel of the first treating apparatus 10 may have an inconvenient position for the user to manipulate, because the first treating apparatus 10 is located on the second treating apparatus 20.

In addition, if the respective control panels are arranged separately for the first treating apparatus 10 and the second treating apparatus 20, it may cause inconvenience for the user to manipulate the first treating apparatus 10 and the second treating apparatus 20 together.

On the other hand, the laundry treating apparatus 1 according to an embodiment of the present disclosure has the single control panel 200 connected to the first treating apparatus 10 and the second treating apparatus 20 together, which may be convenient for the user to manipulate the first treating apparatus 10 and the second treating apparatus 20 together.

Furthermore, in an embodiment of the present disclosure, as the control panel 200 is disposed at a position between the first front panel 112 and the second front panel 122, which is at a vertical level approximately corresponding to a vertical level of a waist of the user, a vertical level convenient for the user to manipulate may be secured.

In addition, in order to secure the vertical level at which ease of use of the user may be improved, as will be described later, in an embodiment of the present disclosure, a vertical level of the second front panel 122 may be higher than a vertical level of the second side panel 125, that is, the second treating apparatus 20. Thus, the control panel 200 may have a higher vertical level, so that the ease of use may be further improved.

In addition, as an upper end of the second front panel 122 is positioned at a vertical level higher than that of an upper end of the second side panel 125, an advantageous structure in the arrangement and the coupling between the first treating apparatus 10 and the second treating apparatus 20 may be implemented.

In one example, FIGS. 1 to 2 show the second treating apparatus 20 having a detergent opening 28 defined therein according to an embodiment of the present disclosure. In an embodiment of the present disclosure, the second treating apparatus 20 may have the tub 24 disposed therein, and the second drum 22 may be rotatably installed inside the tub 24.

The second front panel 122 may include the detergent opening 28 defined therein into which a detergent storage 30 is inserted, and the detergent opening 28 may be located between the second laundry inlet 26 and the control panel 200.

That is, in an embodiment of the present disclosure, the second treating apparatus 20 may be the washing apparatus in which detergent and wash water are injected into the tub 24 to wash the laundry accommodated in the second drum 22. The first treating apparatus 10 may be the dryer, the washing machine, or other apparatus for treating the laundry.

In an embodiment of the present disclosure, in the second treating apparatus 20 including the tub 24 disposed therein and into which the wash water and the detergent are injected, a load may be significantly increased. In an embodiment of the present disclosure, the second treating apparatus 20 may be positioned beneath the first treating apparatus 10 to be supported on the ground.

The second drum 22 may be disposed in the tub 24, and may be constructed to be rotatable by being directly or indirectly connected to a motor or the like. In addition, an embodiment of the present disclosure may have the front loader type in which the second laundry inlet 26 and the second cabinet door 27 are respectively defined in and disposed on the second front panel 122 as shown in FIGS. 1 and 2. Therefore, the second drum 22 may have an open front face and may have a rotation axis parallel to the front and rear direction X.

In one example, the second treating apparatus 20 may include the detergent storage 30 in which the detergent is stored. The detergent storage 30 may be retracted into or extended from the second cabinet 120 through the detergent opening 28.

For example, the user may separate the detergent storage 30 from the second cabinet 120, store the detergent in the detergent storage 30, and then retract the detergent storage 30 into the second cabinet 120 through the detergent opening 28.

FIGS. 1 and 2 schematically show a state in which the detergent storage 30 is inserted into the detergent opening 28 defined in the second front panel 122 of the second treating apparatus 20 according to an embodiment of the present disclosure.

The detergent opening 28 may be located between the second laundry inlet 26 and the control panel 200. That is, the detergent opening 28 may be positioned above the second laundry inlet 26 and below the control panel 200.

In the laundry treating apparatus 1 according to the present disclosure, the second treating apparatus 20 may be located beneath the first treating apparatus 10 and placed on the ground. Thus, the detergent opening 28 may be positioned above the second laundry inlet 26 to facilitate the retraction and the extension of the detergent storage 30 through the detergent opening 28.

In addition, in an embodiment of the present disclosure, which is for securing an advantageous position for the user to use the control panel 200, a distance between the control panel 200 and the first laundry inlet 16 may be the same as a distance between the control panel 200 and the second laundry inlet 26.

That is, the control panel 200 may be located at a center between the first laundry inlet 16 and the second laundry inlet 26 based on the vertical direction. In other words, the control panel 200 may be disposed to have the same distance to the first cabinet door 17 and to the second cabinet door 27.

Accordingly, the user may use the first laundry inlet 16 and the second laundry inlet 26 while at the same time using the control panel 200 having a position that is not biased toward one side, so that the ease of use may be improved.

In one example, as shown in FIGS. 1 to 2, in an embodiment of the present disclosure, the second laundry inlet 26 may be defined at a center of the second front panel 122, the detergent opening 28 may be defined at one side of the upper portion of the second front panel 122, and the control panel 200 may be located above the detergent opening 28.

The detergent opening 28 may be defined at the upper end of the second front panel 122. In addition, the detergent opening 28 may be defined to be biased toward one side of the upper portion of the second front panel 122 in consideration of the shape or the like of the second laundry inlet 26.

FIGS. 1 and 2 show a state in which the detergent opening 28 is defined to be biased to one side in the left and right direction Y at the upper end of the second front panel 122 according to an embodiment of the present disclosure. The detergent opening 28 may be located on a left or right side of the upper portion of the second front panel 122.

In addition, the control panel 200 may be located above the detergent opening 28. That is, the detergent opening 28 defined in the second front panel 122 may be positioned below the control panel 200 positioned on the second front panel 122.

Accordingly, in an embodiment of the present disclosure, the first laundry inlet 16, the control panel 200, the detergent opening 28, and the second laundry inlet 26 may be arranged in order from the top to the bottom. However, in other implementations, the first laundry inlet 16, the control panel 200, the detergent opening 28, and the second laundry inlet 26 are not arranged side by side in the vertical direction Z, and they may be arranged in different orders in the vertical direction Z.

For example, based on the left and right direction Y, the first laundry inlet 16 and the second laundry inlet 26 may be respectively defined at the centers of the first front panel 112 and the second front panel 122, but the detergent opening 28 may be positioned to be biased to one side of the second front panel 122.

However, the detergent opening 28 may be located relatively lower than the first laundry inlet 16 and control panel 200 and may be located relatively upper than the second laundry inlet 26 in the vertical direction Z.

There may be various cross-sectional shapes of the detergent opening 28 viewed from the front, and FIGS. 1 to 2 show the detergent opening 28 having a substantially rectangular cross-section according to an embodiment of the present disclosure.

In one example, referring to FIGS. 1 and 2, in an embodiment of the present disclosure, the second front panel 122 may include a filter opening 29 defined therein into which a filter 40 for collecting foreign substances therein from the wash water is inserted. The filter opening 29 may be defined on one side of a lower portion of the second front panel 122.

The filter 40 may be retracted into the second cabinet 120 through the filter opening 29 and may be connected to a passage of the wash water discharged from the tub 24. The filter 40 may filter the foreign substances from the wash water discharged from the tub 24 after the washing process is performed.

However, the role of the filter 40 may not be necessarily limited thereto, and the filter 40 may be constructed to filter the foreign substances from various objects as needed. For example, the filter 40 may be constructed to filter the foreign substances from the wash water for performing the washing process before proceeding with the washing process.

The user may retract or extend the filter 40 into or from the second cabinet 120 through the filter opening 29. The extended filter 40 may be reused after washing or replaced.

The filter 40 may have a relatively longer retraction/extension cycle than the detergent storage 30. Accordingly, in an embodiment of the present disclosure, the detergent opening 28, into which the detergent storage 30 with a relatively short retraction/extension cycle is retracted, may be defined at the upper portion of the second front panel 122.

In addition, the filter opening 29 into which the filter 40 with a relatively long retraction/extension cycle is retracted may be defined at the lower portion of the second front panel 122, thereby implementing a structure of the second front panel 122 that improves the ease of use and has excellent space utilization.

Furthermore, the wash water discharge passage defined inside the second cabinet 120 and connected to the tub 24 may be located at a lower portion within the second cabinet 120 to facilitate discharge of the wash water. In an embodiment of the present disclosure, the filter 40 and the filter opening 29 may be respectively disposed and defined at the lower portion of the second front panel 122 to be efficiently connected to the wash water discharge passage.

In one example, the filter opening 29 may also be positioned to be biased to one side in the left and right direction Y of the second front panel 122 in consideration of securing the shape and the area of the second laundry inlet 26 like the detergent opening 28.

FIGS. 1 to 2 show the detergent opening 28 and the filter opening 29 defined to be biased toward one side in the left and right direction Y of the second front panel 122 according to an embodiment of the present disclosure.

The detergent opening 28 and the filter opening 29 may be defined to be biased to one side or the other side relative to a center of the second laundry inlet 26 based on the left and right direction Y, for example, to a left or right side, and may be defined side by side in the vertical direction Z.

However, the detergent opening 28 and the filter opening 29 do not necessarily need to be biased to one side in the left and right direction Y. The detergent opening 28 may be biased to one side in the left and right direction Y and the filter opening 29 may be biased to the other side in the left and right direction Y.

Referring to FIG. 2, in the laundry treating apparatus 1 according to an embodiment of the present disclosure, the first laundry inlet 16, the control panel 200, the detergent opening 28, the second laundry inlet 26, and the filter openings 29 may be arranged in order from top to bottom.

In other implementations, at least some of the above described components are not aligned side by side in the vertical direction Z, and a vertical positional relationship of the components may be defined by relative positions of the components. In some examples, the filter opening 29 is not defined vertically below the center of the second laundry inlet 26, but may be defined generally below the center of the second laundry inlet 26.

In one example, the detergent storage 30 inserted into the detergent opening 28 may have a front face forwardly exposed to form one face together with the second front panel 122. That is, the front face of the detergent storage 30 may be located on one face together with the second front panel 122.

The detergent storage 30 having the front face flush with an outer face of the second front panel 122 may form a front appearance of the second treating apparatus 20 together with the second front panel 122. FIGS. 1 to 2 show a state in which the front face of the detergent storage 30 is flush with the outer face of the second front panel 122 according to an embodiment of the present disclosure. A handle may be formed on the front face of the detergent storage 30 to facilitate gripping of the user.

Referring to FIG. 2, when viewing the laundry treating apparatus 1 according to an embodiment of the present disclosure from the front, the control panel 200 may be disposed on the second front panel 122, and the first front panel 112 is disposed on the control panel 200. The first front panel 112, the control panel 200, and the second front panel 122 may have the same width, the center of the first laundry inlet 16 may be located at the center of the first front panel 112, and the center of the second laundry inlet 26 may be located at the center of the second front panel 122. The first laundry inlet 16 and the second laundry inlet 26 may have the same shape and may be aligned side by side in the vertical direction Z.

In addition, in the second front panel 122, the detergent opening 28 may be located above the second laundry inlet 26, but may be located below the control panel 200. The detergent opening 28 may be positioned to be biased to one side at the upper portion of the second front panel 122, the filter opening 29 may be located below the second laundry inlet 26, the filter opening 29 may be located to be biased to one side at the lower portion of the second front panel 122, and the detergent opening 28 and the filter opening 29 may be positioned side by side in the vertical direction Z.

In one example, referring to FIG. 3, in the laundry treating apparatus 1 according to an embodiment of the present disclosure, the upper end of the second front panel 122 may be located in front of the first side panels 115 to support the first side panels 115 rearwardly.

That is, the second front panel 122 may be disposed such that the upper end thereof protrudes upward of the second treating apparatus 20. In other words, the upper end of the second front panel 122 may be positioned at a vertical level higher than that of the upper end of the second side panel 125 to support the lower portion of the first side panel 115 rearwardly.

In addition, the control panel 200 may be positioned on the upper end protruding upward of the second treating apparatus 20, and the lower end of the first front panel 112 may be positioned at a vertical level higher than that of the lower end of the first treating apparatus 10.

For example, as shown in FIG. 3, the control panel 200 may be disposed on a front face of the lower portion of the first treating apparatus 10, and may upwardly face the first front panel 112 and downwardly face the second front panel 122.

For example, in an embodiment of the present disclosure, in the second treating apparatus 20, the second front panel 122 may have a height in the vertical direction Z larger than a height of the second side panel 125 in the vertical direction Z. That is, in the second treating apparatus 20, a length in the vertical direction of the second front panel 122 may be larger than a length in the vertical direction of the second side panel 125.

The lower end of the second front panel 122 and the lower end of the second side panel 125 may be located at the same vertical level, and therefore, the upper end of the second front panel 122 may protrude upward of the second side panel 125 or the second treating apparatus 20, and may be located on a front side of the first treating apparatus 10.

Accordingly, a portion of the second front panel 122 may constitute a portion of the front face of the first treating apparatus 10. The upper end of the second front panel 122 may be located in front of the first side panels 115 of the first treating apparatus 10, and thus, the second front panel 122 may support the first side panels 115 rearwardly.

FIG. 3 shows a height H1 of the upper end of the second front panel 122 protruding upward from the second treating apparatus 20. The height H1 of the upper end of the second front panel 122 may be variously determined in various implementations.

In the laundry treating apparatus 1 according to an embodiment of the present disclosure, the first treating apparatus 10 and the second treating apparatus 20 are manufactured independently of each other and may be assembled together in a space of use. In this connection, the second treating apparatus 20 may be disposed on the ground of the space of use, and then, the first treating apparatus 10 may be placed on the second treating apparatus 20.

When the first treating apparatus 10 is stacked on the second treating apparatus 20 as above, the upper end of the second front panel 122 may serve as means for guiding a correct coupling position of the first treating apparatus 10.

For example, when a worker slides the first treating apparatus 10 forward in the state in which the first treating apparatus 10 is approximately positioned on the second treating apparatus 20, the bottom of the first treating apparatus 10 may be in contact with the upper end of the located second front panel 122, and thus, an optimal fastening position of the first treating apparatus 10 may be determined at least based on the front and rear direction X.

Furthermore, in the state in which the first treating apparatus 10 and the second treating apparatus 20 are fastened with each other to be stacked together, the upper end of the second front panel 122 supports the first treating apparatus 10 rearward, so that the stable coupling may be maintained.

In one example, the second front panel 122 may be constructed to be longer in the vertical direction than the second side panel 125. That is, the second front panel 122 may be constructed with the upper end located at the vertical level higher than the vertical level of the upper end of the second side panel 125 such that the upper end of the second front panel 122 may protrude upward without harming an overall design of the second treating apparatus 20.

The upper end of the second side panel 125 may correspond to the upper end of the second treating apparatus 20. Therefore, an embodiment of the present disclosure may increase only the length of the second front panel 122 in the vertical direction while maintaining numeric values in design of other panels in the second treating apparatus 20.

For example, in an embodiment of the present disclosure, even when the height of the second front panel 122 increases, the detergent opening 28 of the second treating apparatus 20 may be located at a vertical level lower than that of the upper end of the second side panel 125. That is, an embodiment of the present disclosure may increase only the height of the second front panel 122 while maintaining the position of the detergent opening 28 or the length in the vertical direction of the second side panel 125 as it is.

Accordingly, as described above, in a situation in which the first treating apparatus 10 is stacked on the second treating apparatus 20, the second front panel 122 may serve as a stopper capable of determining the position of the first treating apparatus 10, and at the same time, may increase a vertical level from the ground of the control panel 200 disposed on the second front panel 122 to secure a position of the control panel 200 to be conveniently used by the user.

For example, when the second front panel 122 has a height greater than the second side panel 125, the vertical level of the control panel 200 may become relatively higher than that of a control panel that is placed between a second front panel having the same height as a second side panel and a first front panel. Accordingly, this can provide a position that is more convenient for the user to manipulate the control panel 200 using a hand or to visually identify the display 213.

In one example, the lower end of the first front panel 112 may be constructed to be positioned at a vertical level higher than that of the lower end of the first treating apparatus 10 or the lower end of the first side panel 115 such that the upper end of the second front panel 122 and the control panel 200 may be arranged on the front side of the first treating apparatus 10.

The upper end of the first front panel 112 may be located at the same vertical level as the upper end of the first side panel 115, and thus, the height or the length in the vertical direction Z of the first front panel 112 may be smaller than the height or the length in the vertical direction Z of the first side panel 115.

As the lower end of the first front panel 112 is located at the vertical level higher than that of the lower end of the first side panel 115 or the upper end of the second side panel 125, a lower portion of the front face of the first cabinet 110 may be forwardly opened or exposed, and the opened lower portion may be shielded by the control panel 200 and the upper end of the second front panel 122.

The upper end of the second front panel 122 may be located below the first front panel 112 and in front of the first side panels 115. The first side panels 115 may be forwardly exposed to form a coupling relationship with the second treating apparatus 20 by the position of the lower end of the first front panel 112, or arrangement of the first side panels 115 and the second treating apparatus 20 may be easily induced by the second front panel 122.

As the lower end of the first front panel 112 is spaced upwardly apart from the upper end of the second front panel 122, a space may be defined between the first front panel 112 and the second front panel 122, and the control panel 200 may be disposed in the space.

The control panel 200 may be upwardly connected to the first front panel 112 and downwardly connected to the second front panel 122. That is, the first front panel 112, the control panel 200, and the second front panel 122 may form the front face of the laundry treating apparatus 1 according to an embodiment of the present disclosure, and the first front panel 112, the control panel 200, and the upper end of the second front panel 122 may form the front face of the first treating apparatus 10.

The vertical level of the first front panel 112 or the position of the lower end of the first front panel 112 may be variously determined based on the vertical level of the control panel 200 and the vertical level of the upper end of the second front panel 122.

In one example, in the laundry treating apparatus 1 according to the present disclosure, the first front panel 112 and the second front panel 122 may have different lengths in the vertical direction Z.

Referring to FIG. 3, the length in the vertical direction Z, that is, the height H3 of the second front panel 122 whose upper end is located on the lower front side of the first treating apparatus 10 may be larger than the length in the vertical direction Z, that is, the height of the second cabinet 120 forming the appearance of the second treating apparatus 20.

In addition, the length in the vertical direction Z, that is, the height H2 of the first front panel 112 whose lower end is disposed to be spaced upwardly from the second front panel 122 may be smaller than the length in the vertical direction Z, that is, the height of the first cabinet 110 or the first side panel 115 forming the appearance of the first treating apparatus 10.

As above, the first front panel 112 whose height is reduced such that the lower front side of the first treating apparatus 10 is opened, and the second front panel 122 whose height is increased such that the upper end thereof is located on the lower front side of the first treating apparatus 10 may be designed to have different heights.

Further, the length in the vertical direction Z, that is, the height H3 of the second front panel 122 may be greater than the length in the vertical direction Z, that is, the height H2 of the first front panel 112. A deviation between the height H2 of the first front panel 112 and the height H3 of the second front panel 122 or specific values of H2 and H3 may be variously determined in various implementations.

In an embodiment of the present disclosure, the height H2 of the first front panel 112 is smaller than the height H3 of the second front panel 122, so that a structure in which the upper end of the second front panel 122 is located on the lower front side of the first treating apparatus 10 to rearwardly support the first treating apparatus 10, and the lower end of the first front panel 112 is spaced upwardly apart from the second front panel 122 may be effectively implemented.

In one example, referring to FIG. 3, the control panel 200 may be inserted in the space defined as the lower end of the first front panel 112 is spaced upwardly apart from the upper end of the second front panel 122.

That is, the control panel 200 may be inserted between the lower end of the first front panel 112 and the upper end of the second front panel 122 to be positioned at the lower front side of the first treating apparatus 10. As described above, the control panel 200 may be disposed between the first front panel 112 and the second front panel 122, so that the ease of use of the user may be improved.

In one example, as shown in FIG. 3, in an embodiment of the present disclosure, the front face 210 of the control panel 200 that is disposed between the first front panel 112 and the second front panel 122 and is forwardly exposed may be flush with the first front panel 112 and the second front panel 122 in the vertical direction Z.

That is, the front face 210 of the control panel 200 may be positioned on one face together with the first front panel 112 and the second front panel 122. The first front panel 112 and the second front panel 122 may form one face connected through the front face 210, and the control panel 200 may be connected to the first front panel 112 and the second front panel 122 to form one face.

The first front panel 112, the second front panel 122, and the front face 210 of the control panel 200 may together form the front face of the laundry treating apparatus 1 according to an embodiment of the present disclosure. In addition, as shown in FIG. 2, the front face 210 of the control panel 200 may extend along the left and right direction Y to have the width W corresponding to widths of the first front panel 112 and the second front panel 122.

Figure 4:
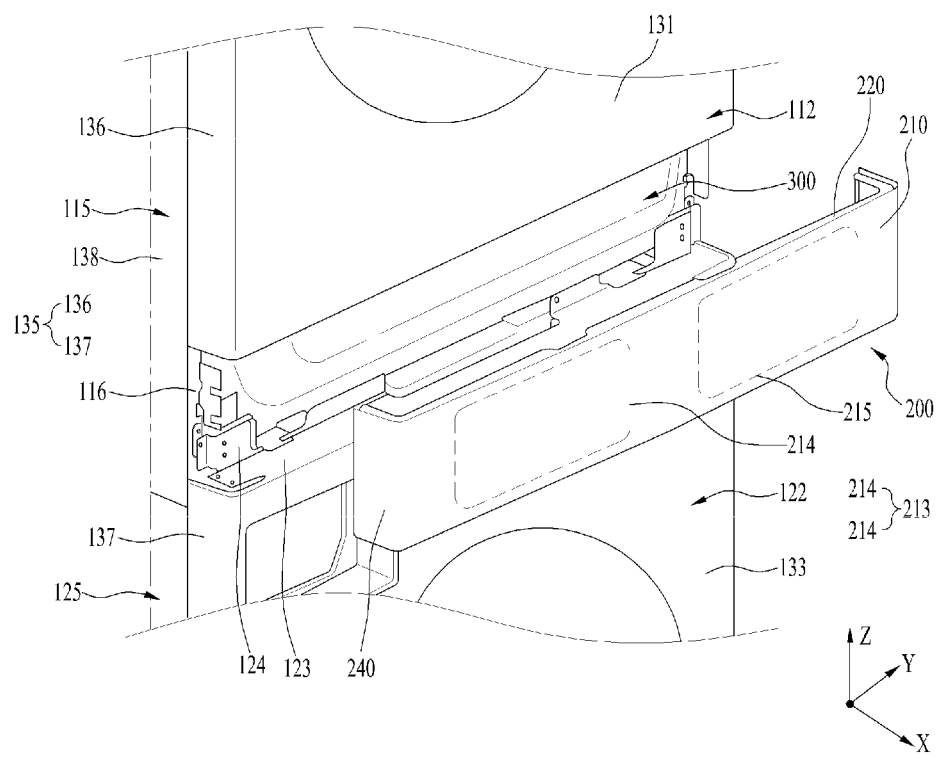
FIG. 4 is a view showing a state in which a control panel is separated from a laundry treating apparatus according to an embodiment of the present disclosure.

In one example, FIG. 4 is a perspective view showing a state in which the control panel 200 is separated from the laundry treating apparatus 1 in an embodiment of the present disclosure. Referring to FIGS. 2 and 4, in an embodiment of the present disclosure, the front face 210 of the control panel 200 may include the first display 214 and the second display 215.

The first display 214 may indicate the operating state of the first treating apparatus 10, and the second display 215 may indicate the operating state of the second treating apparatus 20.

In an embodiment of the present disclosure, the user may monitor the operating states of the first treating apparatus 10 and the second treating apparatus 20 and control the operating states through the single control panel 200.

The front face 210 of the control panel 200 may have the display 213 for visually identifying the operating states of the first treating apparatus 10 and the second treating apparatus 20, and the display 213 may include the first display 214 indicating the state of the first treating apparatus 10 and the second display 215 indicating the state of the second treating apparatus 20.

The first display 214 and the second display 215 may be formed in various shapes. For example, as shown in FIGS. 2 and 4, the first display 214 and the second display 215 may be in a form of being separated and spaced apart from each other or may respectively indicate different information on an integrated region.

In an embodiment of the present disclosure, the first display 214 indicating the state of the first treating apparatus 10 and the second display 215 indicating the state of the second treating apparatus 20 are arranged together on the single control panel 200, so that the user may easily identify the states of the first treating apparatus 10 and the second treating apparatus 20, and may manipulate the manipulation unit to easily control the first treating apparatus 10 and the second treating apparatus 20.

The manipulation unit may be formed in an integrated form for manipulating the first treating apparatus 10 and the second treating apparatus 20 together, or may include a first manipulation unit for manipulating the first treating apparatus 10 and a second manipulation unit for manipulating the second treating apparatus.

Figure 5:
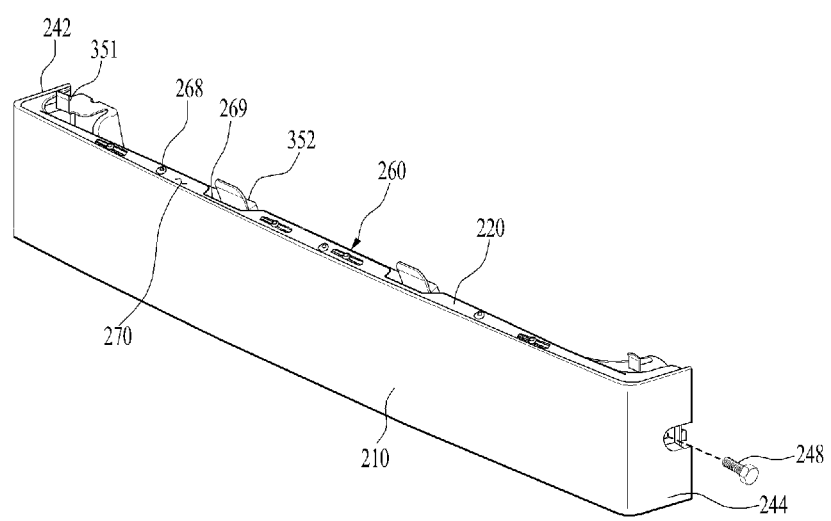
FIG. 5 is a view showing a control panel coupled to a lower frame in a laundry treating apparatus according to an embodiment of the present disclosure.
Figure 6:
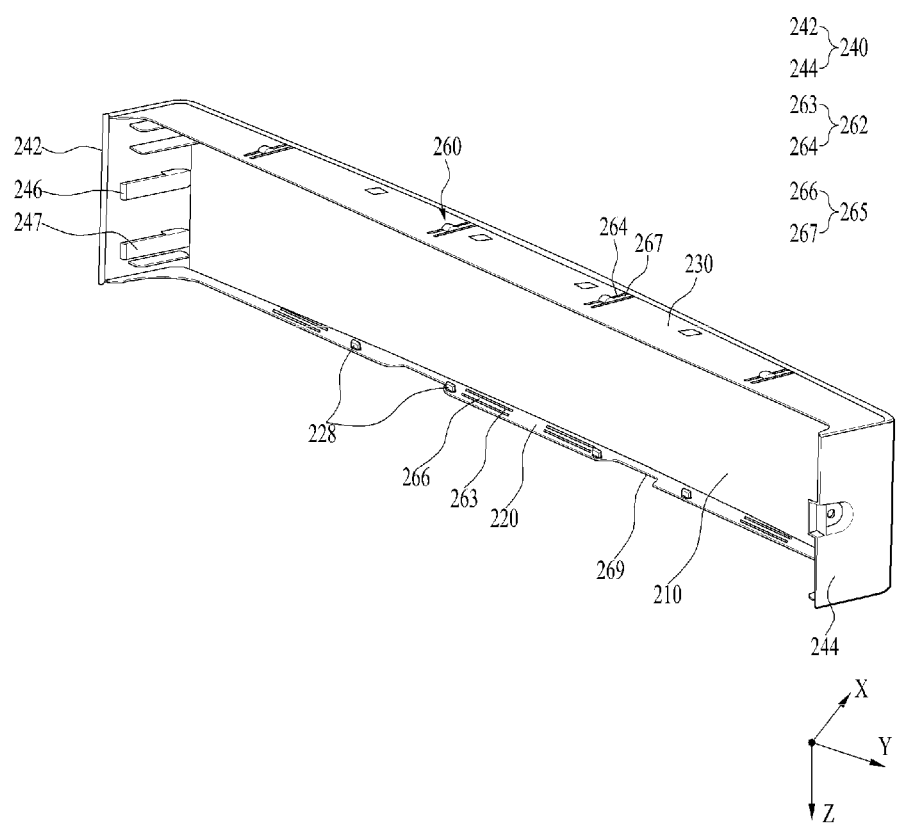
FIG. 6 is a view of a control panel viewed from the rear in a laundry treating apparatus according to an embodiment of the present disclosure.
Figure 7:
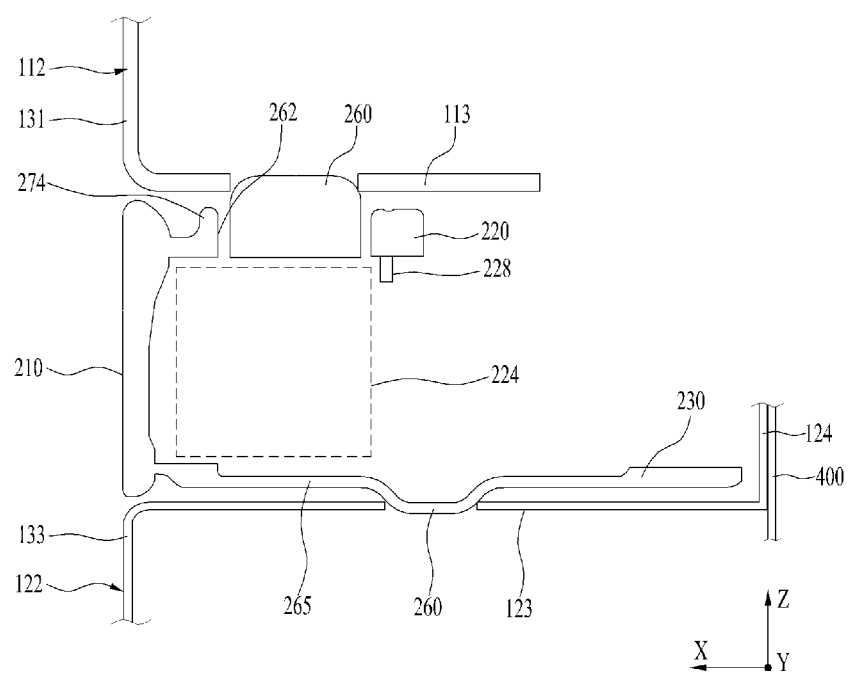
FIG. 7 is a cross-sectional view schematically showing a state in which a control panel is coupled to a laundry treating apparatus according to an embodiment of the present disclosure.

In one example, FIG. 5 shows the control panel 200 coupled with the lower frame 300 to be described later, and FIG. 6 shows a perspective view of the control panel 200 viewed from the rear, and FIG. 7 shows a cross-section of the control panel 200 coupled with the first front panel 112 and the second front panel 122.

Referring to FIGS. 4 to 7, in the laundry treating apparatus 1 according to an embodiment of the present disclosure, the control panel 200 may be fixed by coupling the upper portion of the control panel 200 to the lower portion of the first front panel 112, and further by coupling the lower portion of the control panel 200 to the upper portion of the second front panel 122.

For example, in the control panel 200, the top face 220 extending rearward from the upper end of the front face 210 may be coupled to the first front panel 112, that is, the lower portion of the first front panel 112, and the bottom face 230 extending rearward from the lower end of the front face 210 may be coupled to the second front panel 122, that is, the upper portion of the second front panel 122.

The control panel 200 may form a stable coupling structure as the top face 220 and the bottom face 230 thereof are respectively coupled to the first front panel 112 and the second front panel 122. In addition, as will be described later, the side faces 240 of the control panel 200 may be coupled to the lower frame 300, thereby improving coupling stability.

There may be various schemes for coupling the control panel 200 with the first front panel 112 and the second front panel 122. For example, the control panel 200 may be moved from a position in front of the first treating apparatus 10 toward the first treating apparatus 10 and be inserted between the first front panel 112 and the second front panel 122. In the insertion process of the control panel 200, panel fastening portions 260 that may be respectively disposed on the top face 220 and the bottom face 230 may be respectively coupled to the first front panel 112 and the second front panel 122 as will be described later.

Referring to FIG. 7, in an embodiment of the present disclosure, the second front panel 122 may include an upper bending portion 123 extending rearward from the upper end of the front face 133.

The upper bending portion 123 may be formed by being bent from the front face 133 of the second front panel 122. That is, the upper bending portion 123 may be formed by being bent rearward from the upper end of the second front panel 122.

The upper portion of the control panel 200 may be coupled to the lower end bending portion 113 of the first front panel 112, and the lower portion of the control panel 200 may be coupled to the upper bending portion 123 of the second front panel 122.

For example, the control panel 200 inserted between the first front panel 112 and the second front panel 122 has the top, that is, the top face 220 facing toward the lower end bending portion 113 of the first front panel 112, and the bottom, that is, the bottom face 230 facing toward the upper bending portion 123 of the second front panel 122.

The top face 220 of the control panel 200 may be disposed in parallel with the lower end bending portion 113 of the first front panel 112, and the bottom face 230 of the control panel 200 may be disposed in parallel with the upper bending portion 123 of the second front panel 122. Furthermore, the lower end bending portion 113 of the first front panel 112 and the upper bending portion 123 of the second front panel 122 may also be arranged in parallel with each other.

The top face 220 of the control panel 200 may be coupled to the lower end bending portion 113 of the first front panel 112, and the bottom face 230 of the control panel 200 may be coupled to the upper bending portion 123 of the second front panel 122.

The upper bending portion 123 of the second front panel 122, an upper end of which is positioned at the lower front side of the first treating apparatus 10, may be positioned at a vertical level higher than that of the upper end of the second side panel 125 to support the bottom, that is, the bottom face 230 of the control panel 200.

In addition, the lower end bending portion 113 of the first front panel 112, a lower end of which is spaced upwardly apart from the second front panel 122, will be supported by the top, that is, the top face 220 of the control panel 200.

That is, in an embodiment of the present disclosure, the first front panel 112, the control panel 200, and the second front panel 122 may form a mutual support structure in the vertical direction Z through the upper bending portion 123, the bottom face 230, the top face 220, and the lower end bending portion 113, thereby improving the structural stability of the laundry treating apparatus 1.

In one example, FIG. 5 shows the panel fastening portion 260 disposed on the top face 220 of the control panel 200, and FIG. 6 shows the panel fastening portion 260 disposed on the bottom face 230 of the control panel 200. FIG. 7 schematically shows a cross-section of the panel fastening portions 260 respectively disposed on the top face 220 and the bottom face 230 of the control panel 200 and respectively coupled to the lower end bending portion 113 of the first front panel 112 and the upper bending portion 123 of the second front panel 122.

Referring to FIGS. 5 to 7, the top face 220 and the bottom face 230 may respectively include the panel fastening portions 260 respectively disposed thereon and respectively penetrating and coupled to the lower end bending portion 113 and the upper bending portion 123 respectively facing thereto.

In some implementations, the panel fastening portion 260 may be formed in shape of a hook and coupled to the lower end bending portion 113 or the upper bending portion 123. In other implementations, the panel fastening portion 260 may be formed in a shape of a protrusion and inserted into and coupled to the lower end bending portion 113 or the upper bending portion 123.

FIGS. 5 to 7 show the panel fastening portions 260 respectively inserted into and coupled to the lower end bending portion 113 of the first front panel 112 and the upper bending portion 123 of the second front panel 122 according to an embodiment of the present disclosure. The number, positions, and shapes of the panel fastening portion 260 may be various as desired.

In one example, in an embodiment of the present disclosure, each of the top face 220 and the bottom face 230 may include an opening 262 open in the vertical direction Z and a fastening elastic portion 265 extending from an inner face of the opening 262 to intersect the opening 262. The panel fastening portion 260 of each of the top face 220 and the bottom face 230 may be disposed on the fastening elastic portion 265.

For example, a top face opening 263 may be defined in the top face 220 and a bottom face opening 264 may be defined in the bottom face 230. Each of the top face opening 263 and the bottom face opening 264 may have a shape open in the vertical direction Z and may penetrate each of the top face 220 and the bottom face 230.

The fastening elastic portion 265 may include a top face fastening elastic portion 266 disposed on the top face 220 and a bottom face fastening elastic portion 267 disposed on the bottom face 230. The top face fastening elastic portion 266 may be disposed to intersect the top face opening 263 of the top face 220, and the bottom face fastening elastic portion 267 may be disposed to intersect the bottom face opening 264 of the bottom face 230.

The fastening elastic portion 265 may extend in parallel with the top face 220 or the bottom face 230 from the inner face of each opening 262. For example, the fastening elastic portion 265 may extend from one side of the inner face of the opening 262 and may be connected to the other side of the inner face of the opening 262.

That is, the fastening elastic portion 265 may be disposed on the opening 262. Both ends of the fastening elastic portion 265 are connected to the top face 220 or the bottom face 230 of the control panel 200 in a longitudinal direction, and the remaining portion thereof is separated from the top face 220 or the bottom face 230.

Each opening 262 may have a shape extending in parallel with the longitudinal direction of the fastening elastic portion 265, and may be at least partially shielded in the vertical direction Z by the fastening elastic portion 265.

For example, the fastening elastic portion 265 may be formed by cutting both sides thereof from the top face 220 or the bottom face 230 along the longitudinal direction of the fastening elastic portion 265.

Accordingly, the both ends of the fastening elastic portion 265 connected to the inner face of the opening 262 are fixed, so that a center of the fastening elastic portion 265 may be separated from the top face 220 or the bottom face 230 and be elastically deformed.

In an embodiment of the present disclosure, as the panel fastening portion 260 is disposed on the fastening elastic portion 265, in a process in which each panel fastening portion 260 is moved toward the lower end bending portion 113 of the first front panel 112 or the upper bending portion 123 of the second front panel 122, the fastening elastic portion 265 is pressed and deformed. Further, the fastening elastic portion 265 is restored as the panel fastening portion 260 reaches each coupling point, so that the coupling structure may be formed.

In one example, FIG. 5 shows a panel support 268 disposed on the top face 220 of the control panel 200 according to an embodiment of the present disclosure. The panel support 268 may be distinguished from the panel fastening portion 260, and an upper end of the panel support 268 may upwardly support the lower end bending portion 113 of the first front panel 112. The number and a shape of the panel supports 268 may be various, and the panel support 268 may have a top face in parallel with the lower end bending portion 113.

The panel support 268 may protrude upward from the top face 220 of the control panel 200 like the panel fastening portion 260. However, unlike the panel fastening portion 260 inserted into the lower end bending portion 113, the panel support 268 may be in contact with the bottom face of the lower end bending portion 113 to support the lower end bending portion 113. The panel support 268 may have a protrusion shape like the panel fastening portion 260.

In an embodiment of the present disclosure, as the panel support 268 supporting the bottom of the first front panel 112 is disposed on the top face 220 of the control panel 200, the first front panel 112 may be stably supported. Furthermore, because the panel support 268 of the control panel 200 supports the first front panel 112 together with the top support 356 of the lower frame 300, structural stability may be improved.

In an embodiment of the present disclosure, the panel fastening portion 260 may have a protrusion height greater than that of the panel support 268. Accordingly, an entirety of the lower end bending portion 113 may have a flat face, and a structure in which the panel fastening portion 260 is inserted into the lower end bending portion 113 of the first front panel 112, and the panel support 268 supports the lower end bending portion 113 may be realized.

In one example, each of the first front panel 112 and the second front panel 122 may include each of the front faces 131 and 133 exposed forward of the laundry treating apparatus 1 according to an embodiment of the present disclosure, and may include lateral bending portions 135 respectively extending rearward from both ends in the left and right direction Y of each of the front faces 131 and 133.

In an embodiment of the present disclosure, the lateral bending portions 135 may include first lateral bending portions 136 arranged on the first front panel 112 and second lateral bending portions 137 arranged on the second front panel 122. FIGS. 1, 3, and 4 show the first lateral bending portions 136 and the second lateral bending portions 137 according to an embodiment of the present disclosure.

The front face 131 of the first front panel 112 may be exposed forwardly of the first treating apparatus 10, and the first lateral bending portions 136 may be respectively disposed at both ends in the left and right direction Y of the first front panel 112. The front face 133 of the second front panel 122 may be exposed forwardly of the second treating apparatus 20, and the second lateral bending portions 137 may be respectively disposed at both ends in the left and right direction Y of the second front panel 122.

Each lateral bending portion 135 may be formed by being bent to extend rearward from each of the front faces 131 and 133 of the first front panel 112 and the second front panel 122. That is, the first lateral bending portions 136 may be formed integrally with the front face 131 of the first front panel 112 and bent rearward from the front face 131 of the first front panel 112, and the second lateral bending portions 137 may be formed integrally with the front face 133 of the second front panel 122 and bent rearward from the front face 133 of the second front panel 122.

In one example, the lateral bending portions 135 of the second front panel 122, that is, the second lateral bending portion 137, have upper ends positioned at a vertical level higher than that of the upper end of the second side panel 125, so that the second lateral bending portions 137 may support the first side panels 115 rearwardly.

The second lateral bending portions 137 may have the same height as the front face 133 of the second front panel 122. That is, the upper end of the second front panel 122 may include the upper ends of the second lateral bending portions 137. Therefore, as shown in FIG. 3, the upper end of the second front panel 122 may be located at the vertical level higher than that of the second side panels 125, and the upper ends of the second lateral bending portions 137 may also be located at the vertical level higher than that of the second side panel 125.

That is, in the second front panel 122, the second lateral bending portions 137 may be respectively in contact with the first side panels 115 of the first treating apparatus 10 to support the first side panels 115 rearwardly.

In one example, the first side panel 115 and the second side panel 125 may be arranged side by side such that front ends thereof are aligned in a line along the vertical direction Z. In addition, a rear end of the lateral bending portion 135 of the second front panel 122 may be constructed to be in contact with the front ends of the first side panel 115 and the second side panel 125 together.

In addition, as described above, the side faces 240 extending rearward may be respectively disposed on both sides in the left and right direction Y of the front face 210 of the control panel 200. The side face 240 may be disposed between the first lateral bending portion 136 and the second lateral bending portion 137 and be positioned side by side with the first lateral bending portion 136 and the second lateral bending portion 137 in the vertical direction Z.

Referring to FIG. 1, in an embodiment of the present disclosure, the front face 131 of the first front panel 112, the front face 133 of the second front panel 122, and the front face 210 of the control panel 200 may be aligned side by side on the front face of the laundry treating apparatus 1.

In addition, the first lateral bending portion 136, the second lateral bending portion 137, and the side face 240 of the control panel 200 may be arranged side by side on the side face of the laundry treating apparatus 1. That is, the side face 240 may be arranged side by side with the first lateral bending portion 136 and the second lateral bending portion 137 in the vertical direction.

In one example, the side face 240 of the control panel 200, the first lateral bending portion 136, the second lateral bending portion 137, the first side panel 115, and the second side panel 125 may be arranged side by side on the side face of the laundry treating apparatus 1. The second lateral bending portion 137 may be located in front of the first side panel 115 and may be aligned side by side with the first side panel 115 in the front and rear direction X.

For example, the first side panel 115 and the second side panel 125 may be aligned side by side in the vertical direction Z to form one face. The first side panel 115 and the first lateral bending portion 136 may be aligned side by side in the front and rear direction X to form one face. The second side panel 125 and the second lateral bending portion 137 may be aligned side by side in the front and rear direction X to form one face.

In addition, the first lateral bending portion 136, the second lateral bending portion 137, and the side face 240 of the control panel 200 may be aligned side by side in the vertical direction Z to form one face. Eventually, in an embodiment of the present disclosure, the side face 240 of the control panel 200, the first lateral bending portion 136, the second lateral bending portion 137, the first side panel 115, and the second side panel 125 may be aligned side by side together to form one face, that is, the side face of the laundry treating apparatus 1.

In one example, in an embodiment of the present disclosure, the second front panel 122 may further include an upper fastening portion 124. FIG. 4 shows the upper fastening portion 124 of the second front panel 122 coupled to the first treating apparatus 10.

Referring to FIG. 4, the upper fastening portion 124 may extend upward from the upper bending portion 123 of the second front panel 122 and may be coupled to the first treating apparatus 10. In the second front panel 122, the upper fastening portion 124 may be coupled to the first treating apparatus 10, thereby securing the coupling stability.

As will be described later, the upper fastening portion 124 may be penetrated by a second fastening member 472 together with the upper frame 400 and be fastened to a second fastening hole 470.

Referring to FIG. 4, the upper fastening portion 124 may be disposed above the second front panel 122, and the upper fastening portion 124 may be disposed on the upper bending portion 123 of the second front panel 122. That is, the upper fastening portion 124 may have a shape extending upward from a rear end of the upper bending portion 123 extending rearward from the upper end of the second front panel 122.

The upper bending portion 123 may be bent rearward from the upper end of the second front panel 122, and the upper fastening portion 124 may be bent upward from the rear end of the upper bending portion 123.

The upper fastening portion 124 may have the same width as the widths of the front face 133 of the second front panel 122 and the upper bending portion 123, or a plurality of upper fastening portions 124 with a width smaller than that of the upper bending portion 123 may be aligned with each other along a width direction. FIG. 4 shows a state in which the upper fastening portions 124 are respectively disposed on both sides in the width direction of the upper bending portion 123 according to an embodiment of the present disclosure.

In an embodiment of the present disclosure, both sides in the left and right direction Y of the upper fastening portion 124 may be respectively fastened to the first side panels 115 respectively facing thereto. That is, in the upper fastening portion 124, a portion overlapping the first side panel 115 in the front and rear direction X may be coupled to the first side panel 115. For example, portions of the upper fastening portion 124 respectively extending upward from the both sides in the left and right direction Y of the upper bending portion 123 may be respectively coupled to the first side panels 115.

Figure 8:
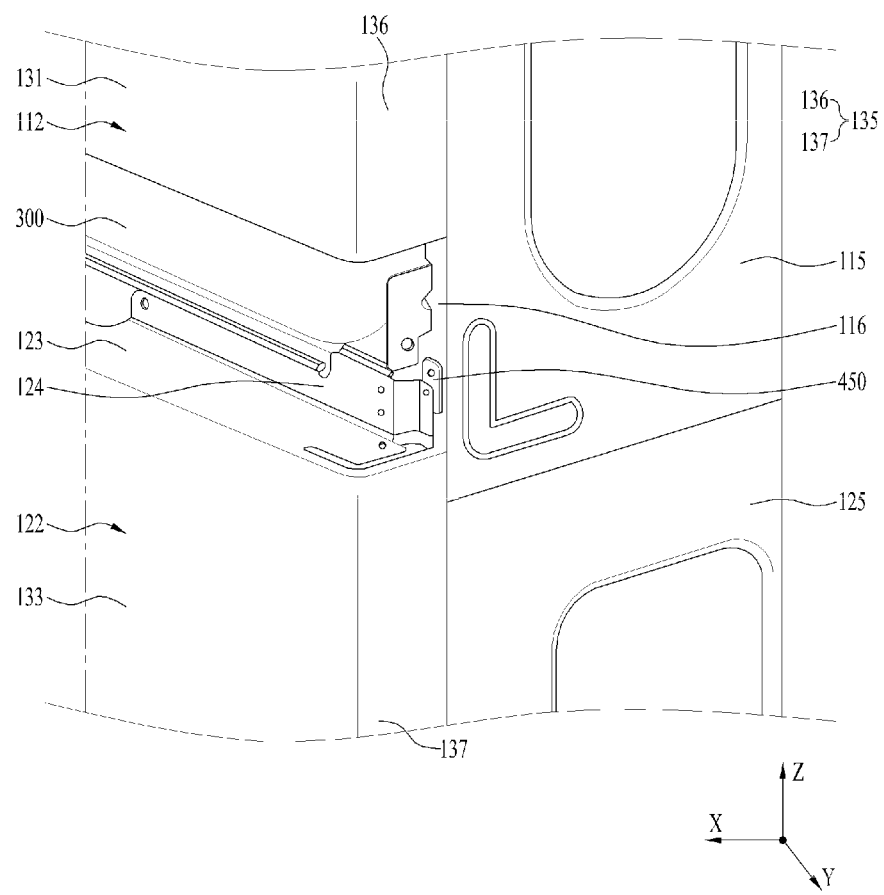
FIG. 8 is a view showing a state in which a second front panel and a first side panel are coupled to each other in a laundry treating apparatus according to an embodiment of the present disclosure.
Figure 9:
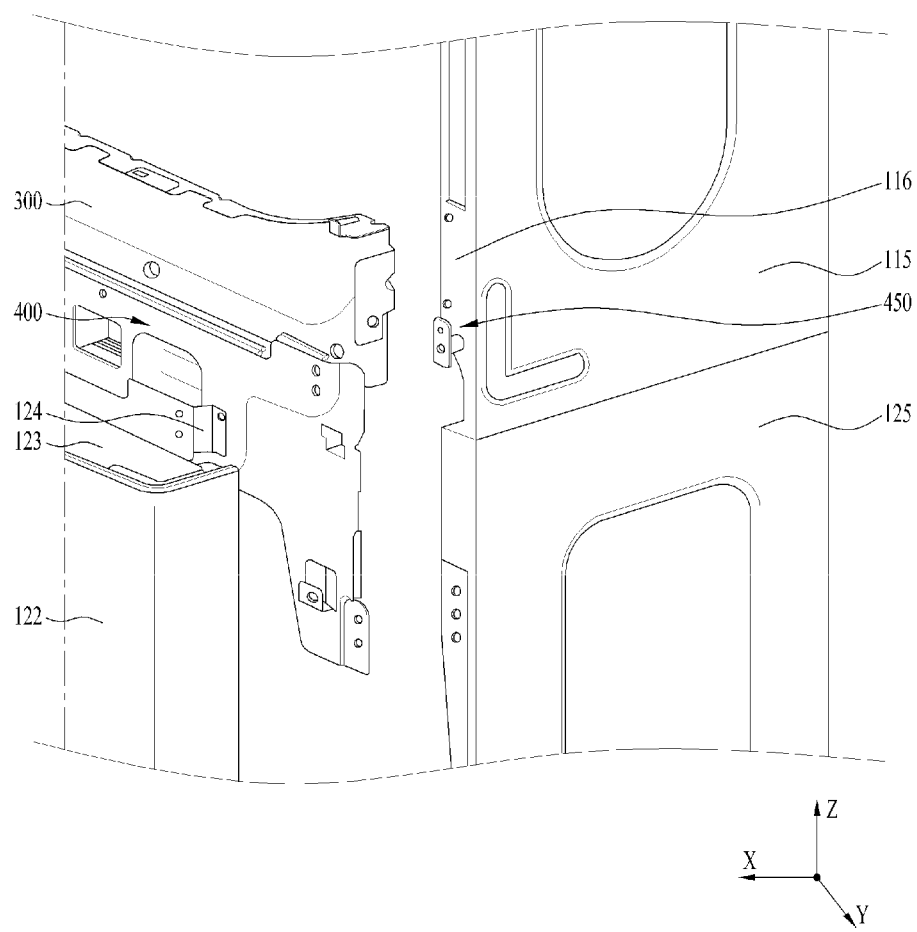
FIG. 9 is a view showing a state in which a second front panel is separated from a first side panel in a laundry treating apparatus in FIG. 8.

In one example, FIG. 8 shows the upper fastening portion 124 coupled to the first side panel 115, and FIG. 9 shows the upper fastening portion 124 separated from the first side panel 115.

Referring to FIGS. 8 and 9, in an embodiment of the present disclosure, each first side panel 115 may include a front bending portion 116 in the front, and each upper fastening portion 124 of the second front panel 122 may be fastened to the front bending portions 116 of each first side panel 115.

The front bending portion 116 may be constructed to extend in the left and right direction Y from a front end of the first side panel 115, and may be formed by being bent from the side face 138 of the first side panel 115 forming the side face of the first treating apparatus 10.

The front bending portion 116 may extend along the left and right direction Y of the first treating apparatus 10 toward the interior of the first treating apparatus 10. That is, the first side panel 115 disposed on one side in the left and right direction Y of the first treating apparatus 10 may include a front bending portion 116 extending toward the other side in the left and right direction Y, and the first side panel 115 disposed on the other side in the left and right direction Y of the first treating apparatus 10 may include a front bending portion 116 extending toward one side in the left and right direction Y.

The front bending portion 116 may have a face parallel to the first front panel 112 and the second front panel 122. That is, the front bending portion 116 may be formed in a plate shape parallel to the first front panel 112, the second front panel 122, and the front face 210 of the control panel 200.

In one example, the upper fastening portion 124 extending upward from the upper bending portion 123 of the second front panel 122 may also be formed in a plate shape parallel to the front bending portion 116. Each upper fastening portion 124 may be fastened to each front bending portion 116 disposed parallel to each upper fastening portion 124, and various fastening schemes may be used such as using a fastening member as will be described below.

In addition, the front face 210 of the control panel 200 is positioned parallel to the front face 133 of the second front panel 122 in the vertical direction Z, and the upper fastening portion 124 is disposed on the upper bending portion 123 extending rearward from the second front panel 122, so that the upper fastening portion 124 may be located at the rear of the front face 210 of the control panel 200.

That is, each upper fastening portion 124 may be positioned between the control panel 200 and the front bending portion 116 of each first side panel 115. Thus, each upper fastening portion 124 may be coupled to the front bending portion 116 of each first side panel 115 at the rear of the front face 210, and a coupling structure between the first side panel 115 and the upper fastening portion 124 may be shielded from the outside by the control panel 200. FIG. 7 shows the upper fastening portion 124 positioned at the rear of the front face 210 of the control panel 200.

In one example, referring to FIG. 7, in an embodiment of the present disclosure, the upper fastening portion 124 may be positioned at the rear of the bottom face 230 of the control panel 200. That is, the bottom face 230 may extend such that a rear end thereof is positioned in front of the upper fastening portion 124. Accordingly, the control panel 200 is inserted between and coupled to the first front panel 112 and the second front panel 122 at a position in front of the upper fastening portion 124, so that structural interference between the control panel 200 and the upper fastening portions 124 may be avoided.

In addition, in an embodiment of the present disclosure, the side face 240 of the control panel 200 is extended such that the rear end thereof is positioned at the rear of the bottom face 230 to face toward the first side panel 115.

That is, an extended length of the side face 240 from the front face 210 may be greater than an extended length of the bottom face 230 from the front face 210. The bottom face 230 of the control panel 200 has a rear end positioned in front of the upper fastening portion 124 in order to exclude structural interference with the upper fastening portion 124 and the like, and the side face 240 may extend such that the rear end thereof is in contact with the first side panel 115 in order to shield the interior of the control panel 200 from the outside.

FIG. 6 shows the side faces 240 whose extended length along the front and rear direction X is greater than that of the bottom face 230 according to an embodiment of the present disclosure.

Figure 10:
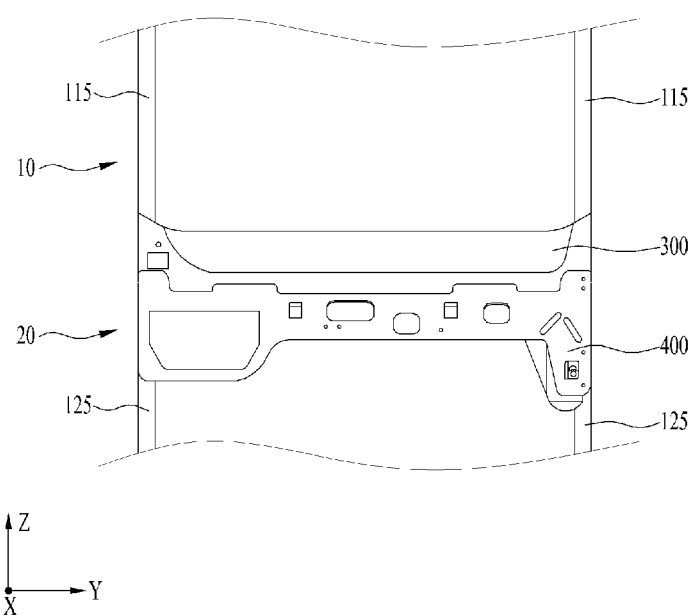
FIG. 10 is a view showing an upper frame in a laundry treating apparatus according to an embodiment of the present disclosure.

In one example, FIG. 9 shows the upper frame 400 disposed between the upper fastening portion 124 and the first side panel 115 according to an embodiment of the present disclosure, and FIG. 10 is a view of the upper frame 400 coupled to the first treating apparatus 10 viewed from the front.

Referring to FIGS. 9 and 10, in an embodiment of the present disclosure, the second treating apparatus 20 may include the upper frame 400. The upper frame 400 may be disposed between the second front panel 122 and each second side panel 125 and coupled to each second side panel 125. An upper end of the upper frame 400 positioned above the second side panels 125 may be coupled to the front bending portions 116 together with the upper fastening portions 124.

That is, in the upper frame 400, each lower end may be positioned between the second front panel 122 and each second side panel 125, and the upper end may protrude upward of the second side panels 125.

For example, the upper frame 400 may be positioned on an upper portion of the front face of the second treating apparatus 20, and may be coupled to the second side panels 125 of the second treating apparatus 20, and the like. In addition, the upper frame 400 may be constructed to be coupled to the first treating apparatus 10 to fasten the first treating apparatus 10 and the second treating apparatus 20 to each other.

The upper frame 400 is disposed on the rear face of the second front panel 122, and may be disposed in front of the second top panel and the second side panels 125 of the second treating apparatus 20 as shown in FIG. 10. That is, the upper frame 400 may be disposed between the second front panel 122 and each second side panel 125.

The upper frame 400 may be coupled to the second side panels 125 on the both sides in the left and right direction Y, and may be forwardly coupled to the second front panel 122. The upper frame 400 may contribute to improving structural stability and rigidity of the upper portion of the second treating apparatus 20.

The upper frame 400 may be fixed to the second treating apparatus 20, and the upper portion of the upper frame 400 extending upwards may be coupled to the lower portion of the first treating apparatus 10. The upper frame 400 may have a face parallel to the second front panel 122 and may be disposed on the front face of the second treating apparatus 20.

The upper portion of the upper frame 400 may be coupled to the front bending portions 116 of the first side panels 115. The upper frame 400 may be coupled to the front bending portions 116 of the first side panels 115 together with the upper fastening portions 124 of the second front panel 122.

That is, the upper fastening portion 124 may be disposed at the upper end of the second front panel 122 and may be coupled to the first treating apparatus 10. The upper fastening portion 124 may be disposed to cover the upper frame 400 from the front, that is, covers the front face of the upper frame 400, and may be coupled to the first treating apparatus 10 together with the upper frame 400.

The upper frame 400 may be formed in a plate shape having a face parallel to the front face 133 of the second front panel 122, and may be disposed between the second front panel 122 and each second side panel 125 in the second treating apparatus 20 to be coupled to each second side panel 125. The upper portion of the upper frame 400 protruding upward of the second treating apparatus 20 may be disposed between each upper fastening portion 124 of the second front panel 122 and the front bending portion 116 of each first side panel 115, and be coupled to the front bending portion 116 of each first side panel 115. The upper frame 400 may be coupled to the front bending portions 116 together with the upper fastening portions 124.

In one example, FIG. 8 shows a state in which each upper fastening portion 124 and the upper frame 400 are coupled to each first side panel 115 through each insulating connection member 450, and FIG. 9 shows a state in which each upper fastening portion 124, the upper frame 400, and each insulating connection member 450 are separated from each other.

As shown in FIGS. 8 and 9, the laundry treating apparatus 1 according to an embodiment of the present disclosure may include each insulating connection member 450 disposed between the upper frame 400 and each front bending portion 116 to insulate the upper frame 400 and each upper fastening portion 124 from each front bending portion 116.

In an embodiment of the present disclosure, the first treating apparatus 10 and the second treating apparatus 20 may correspond to apparatuses that are independent of each other, and may respectively have components that use electricity, such as the motor, the controller, or the like, therein.

When a situation in which the electricity leaks from one of the first treating apparatus 10 and the second treating apparatus 20 occurs, it is desired to prevent the leaked electricity from affecting the other.

That is, the first treating apparatus 10 and the second treating apparatus 20 need to be electrically insulated from each other, so that electric leakage does not occur therebetween.

Accordingly, an embodiment of the present disclosure may use the insulating connection member 450 for fastening the upper frame 400 of the second treating apparatus 20 with the first treating apparatus 10, and the upper frame 400 may be connected to the first treating apparatus 10 through the insulating connection member 450.

The insulating connection member 450 may be made of the insulating material. The insulating material may be selected as various materials according to need, such as a plastic material, a rubber material, a mixed material of the plastic and the rubber, or the like.

Figure 16:
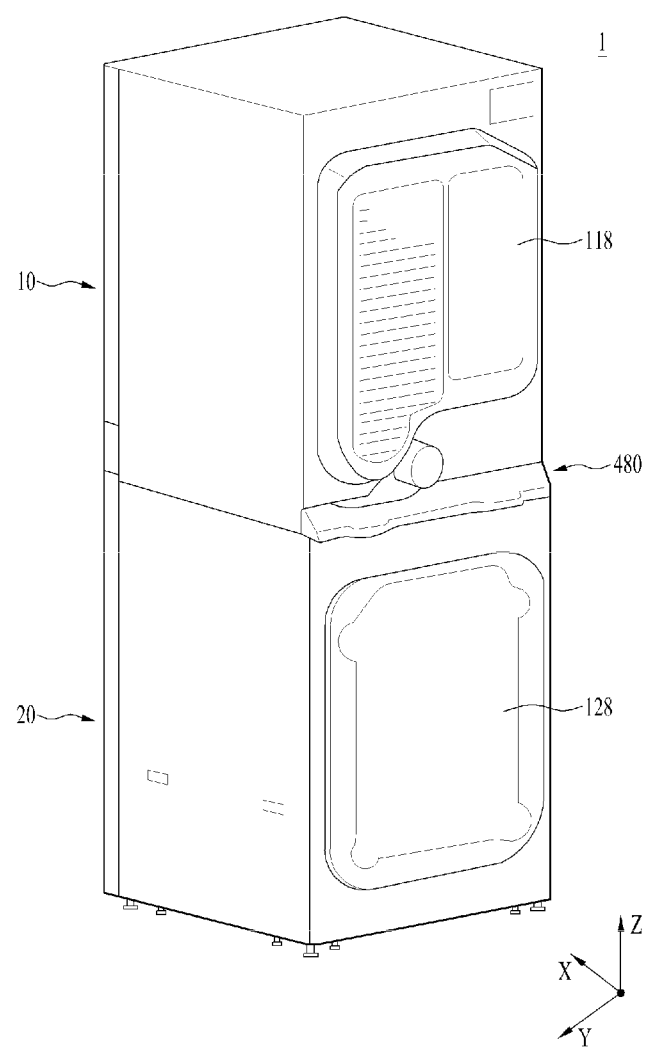
FIG. 16 is a view showing a view of a laundry treating apparatus according to an embodiment of the present disclosure viewed from the rear.
Figure 17:
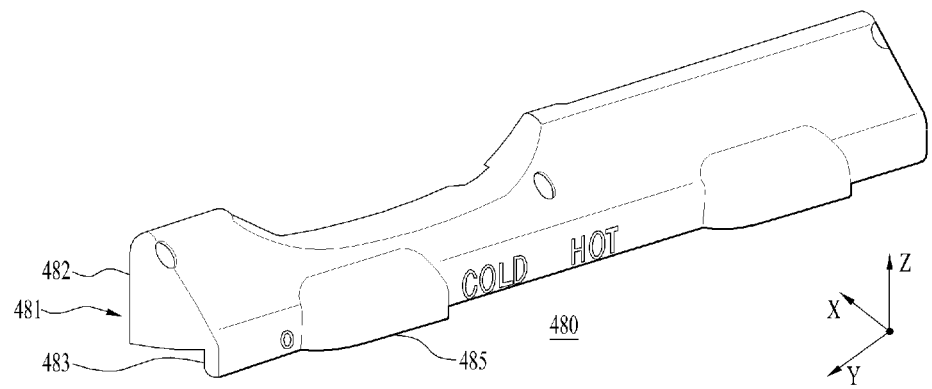
FIG. 17 is a view showing a rear bracket in a laundry treating apparatus according to an embodiment of the present disclosure.

The insulating connection member 450 may insulate the upper frame 400 and the first treating apparatus 10 from each other while fastening the upper frame 400 with the first side panel 115. FIGS. 16 and 17 show a state in which the upper frame 400 is coupled to the first side panels 115 of the first treating apparatus 10 and is insulated from the first side panels 115 through the insulating connection members 450, according to an embodiment of the present disclosure.

The insulating connection member 450 may be formed in various shapes, and may fasten the first treating apparatus 10 with the upper frame 400 in various fastening schemes. For example, the insulating connection member 450 may have the various fastening schemes, such as being formed in a hook shape, including a coupling member inserted therein, or being adhered to one face of the upper frame 400.

Referring to FIG. 10, in an embodiment of the present disclosure, in the upper frame 400, lower portions of both side portions in the left and right direction Y may be respectively coupled to the second side panels 125, and upper portions of the both side portions may be respectively coupled to the first side panels 115 through the insulating connection members 450.

The upper frame 400 may have a face parallel to the front face 133 of the second front panel 122, and may extend in the left and right direction Y, so that at least portions of the both side portions in the left and right direction Y may be arranged in front of the second side panels 125.

The lower portions of the both side portions of the upper frame 400 may be respectively coupled to the second side panels 125, and the upper portions of the both side portions may be respectively coupled to the first side panels 115. That is, the both sides in the left and right direction Y of the upper frame 400 may be coupled together to the first front panel 112 of the first treating apparatus 10 and the second front panel 122 of the second treating apparatus 20.

Figure 11:
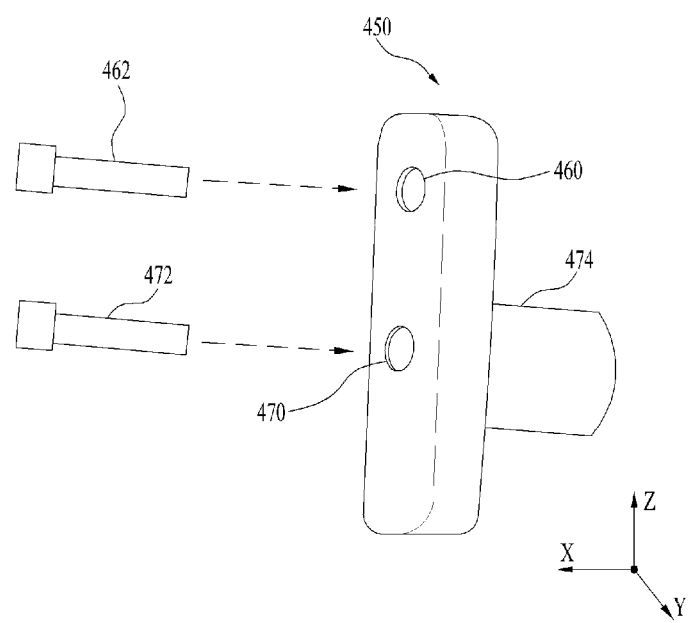
FIG. 11 is a view showing an insulating connection member in a laundry treating apparatus according to an embodiment of the present disclosure.
Figure 12:
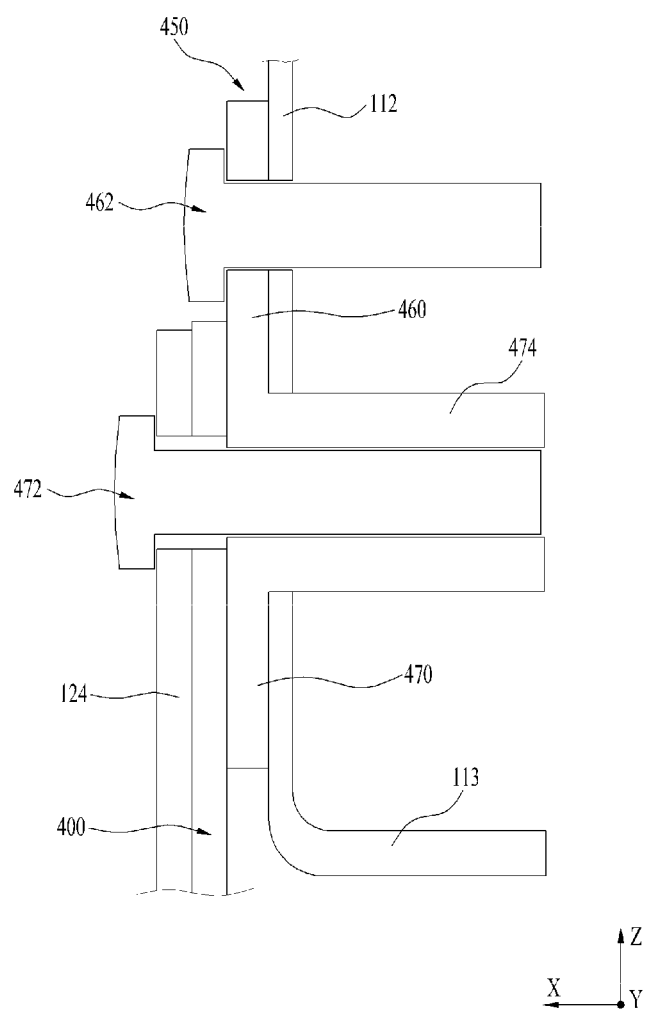
FIG. 12 is a cross-sectional view showing a coupling structure of an insulating connection member in a laundry treating apparatus according to an embodiment of the present disclosure.

FIG. 11 shows a perspective view of the insulating connection member 450, and FIG. 12 is a cross-sectional view showing the coupling structure of each first side panel 115, the insulating connection member 450, and the upper frame 400.

Referring to FIGS. 11 to 12, in an embodiment of the present disclosure, each insulating connection member 450 may include a first fastening hole 460 and a second fastening hole 470 defined therein. The first fastening hole 460 may be coupled to the first side panel 115, the second fastening hole 470 may be coupled to the upper frame 400, and the second fastening hole 470 may insulate the upper frame 400 and the first side panel 115 from each other.

For example, the insulating connection member 450 may have the first fastening hole 460 and the second fastening hole 470 connected to each other. The insulating connection member 450 may be fixed to the first side panel 115 as the first fastening hole 460 is coupled to the first side panel 115.

The upper frame 400 is fixed to the insulating connection members 450, and the insulating connection members 450 are respectively fixed to the first side panels 115, such that the fixing structure or the coupling structure between the upper frame 400 and the first side panel 115 may be formed.

The coupling scheme between the first fastening hole 460 and the first side panel 115 and the coupling scheme between the second fastening hole 470 and the upper frame 400 may be variously determined as needed. For example, a fitting coupling, a hook coupling, or the like may be used, or the coupling relationship may be formed through a fastening member penetrating the insulating connection member 450 as shown in FIGS. 11 and 12.

The upper frame 400 is coupled to the first side panels 115 through the insulating connection members 450 made of the insulating material, so that the insulation between the upper frame 400 and the first side panels 115 may be achieved by the insulating connection members 450.

For example, as shown in FIG. 11, the second fastening hole 470 of the upper frame 400 may be positioned between the upper frame 400 and the first side panel 115 to prevent direct contact between the upper frame 400 and the first side panel 115, thereby insulating the upper frame 400 and the first side panel 115 from each other.

In one example, the first fastening hole 460 may extend upward from the second fastening hole 470 coupled with the upper frame 400, and the upper frame 400 coupled to the second fastening hole 470 may be fastened to the first side panel 115 through the first fastening hole 460.

The both side portions of the upper frame 400 extending upward from the second treating apparatus 20 are respectively coupled to the second fastening holes 470, and the first fastening holes 460 are respectively coupled to the first side panels 115 while being respectively coupled to the second fastening holes 470, so that the first fastening hole 460 may be located above the second fastening hole 470.

That is, the first fastening hole 460 located at an upper portion of each insulating connection member 450 may be coupled to each first side panel 115, and the second fastening hole 470 located at a lower portion of each insulating connection member 450 may be coupled to the upper frame 400 while facing each side portion of the upper frame 400.

In other words, the first fastening hole 460 may be defined above the second fastening hole 470, and the second fastening hole 470 may be defined below the first fastening hole 460.

In one example, as shown in FIG. 11, in an embodiment of the present disclosure, a fastening member forming a coupling structure of each insulating connection member 450 may be included, and the fastening member may include a first fastening member 462 and a second fastening member 472.

The first fastening member 462 may penetrate the first fastening hole 460 and the first side panel 115 together to fasten the first fastening hole 460 with the first side panel 115, and the second fastening member 472 may penetrate the upper frame 400 and be inserted into the second fastening hole 470 to fasten the upper frame 400 with the second fastening hole 470.

That is, each upper fastening portion 124 of the first front panel 112 and the upper frame 400 described above may be coupled to each insulating connection member 450 or each first side panel 115 by the fastening member, that is, the second fastening member 472. The second fastening hole 470 may insulate the second fastening member 472 and the first side panel 115 from each other.

For example, each insulating connection member 450 may be coupled to each first side panel 115 and the upper frame 400 through each first fastening member 462 and each second fastening member 472. The first fastening member 462 may be formed in a shape of a screw, a rivet, or the like, and may penetrate the first fastening hole 460 and the first side panel 115 together.

Because the first fastening member 462 is not directly in contact with the upper frame 400, the first fastening hole 460 does not need to insulate the first fastening member 462 and the first side panel 115 from each other.

In one example, the upper frame 400 may be penetrated by the second fastening member 472, and the second fastening member 472 that penetrates the upper frame 400 may be coupled to the second fastening hole 470 of the insulating connection member 450. In this connection, the second fastening hole 470 may be defined to insulate the second fastening member 472 and the first side panel 115 from each other.

The second fastening member 472 that may penetrate the upper frame 400 and may be in contact with and electrically connected to the upper frame 400 needs to be electrically insulated from the first side panel 115. Accordingly, the insulating connection member 450 according to an embodiment of the present disclosure may be constructed such that the second fastening hole 470 insulates the second fastening member 472 and the first side panel 115 from each other.

There may be various schemes of insulating, by the second fastening hole 470, the second fastening member 472 and the first side panel 115 from each other. For example, the second fastening hole 470 may be disposed in front of the first side panel 115, and the second fastening member 472 may be inserted into and coupled to only the second fastening hole 470 excluding the first side panel 115 in the state of penetrating the upper frame 400, so that the second fastening member 472 may be insulated from the first side panel 115.

Alternatively, as shown in FIGS. 11 to 12, the second fastening hole 470 may be defined to surround the second fastening member 472 to insulate the first side panel 115 and the second fastening member 472 from each other.

In one example, as shown in FIGS. 11 to 12, in an embodiment of the present disclosure, the second fastening hole 470 may include a fastening insulating portion 474. The fastening insulating portion 474 may extend to penetrate the first side panel 115, at least a portion of the second fastening member 472 may be inserted into the fastening insulating portion 474, and the fastening insulating portion 474 may insulate the second fastening member 472 and the first side panel 115 from each other.

The fastening insulating portion 474 may be formed in a hollow shape, and may extend along an insertion direction of the second fastening member 472 to penetrate the first side panel 115. That is, the second fastening member 472 may be constructed to penetrate the upper frame 400 and the first side panel 115 together, but a portion of the second fastening member 472 penetrating the first side panel 115 may be surrounded by the fastening insulating portion 474.

The second fastening member 472 that penetrates the upper frame 400 may penetrate the second fastening hole 470 and may be inserted into and coupled to the fastening insulating portion 474. The second fastening member 472 may penetrate the upper frame 400 or the first side panel 115 in the longitudinal direction like the screw or the rivet.

The second fastening member 472 may be coupled to the second fastening hole 470 through the fastening insulating portion 474, while having a length that penetrates the first side panel 115 and the upper frame 400, thereby improving the coupling force. Because the second fastening member 472 is eventually inserted into and coupled to the fastening insulating portion 474 of the second fastening hole 470, the insulation between the first side panel 115 and the second fastening member 472 may be achieved. Accordingly, the upper frame 400 that may be electrically connected to the second fastening member 472 may be insulated from the first side panel 115.

The fastening insulating portion 474 may be formed in a shape in which an extended end thereof is sealed to receive the second fastening member 472 in the fastening insulating portion 474, or in a shape in which the extended end is opened and an end of the second fastening member 472 is exposed to the outside of the fastening insulating portion 474.

The fastening insulating portion 474 may be constructed to surround at least a portion of the second fastening member 472 that is positioned parallel to the first side panel 115 to receive at least a portion of the second fastening member 472 therein, and may insulate the first side panel 115 and the second fastening member 472 from each other. The first fastening member 462 and the second fastening member 472 may be separated apart from each other to be electrically separated from each other.

In one example, the fastening insulating portion 474 may be constructed to penetrate the front bending portion 116 of the first side panel 115. The front bending portion 116 may have a face parallel to the first front panel 112, and the first fastening member 462 and the second fastening hole 470 may have lengths in the front and rear direction X and may penetrate the front bending portion 116 along the front and rear direction X.

The insulating connection member 450 and the upper frame 400 may be located in front of the front bending portion 116 of the first side panel 115, and the fastening insulating portion 474 may extend rearwardly from the second fastening hole 470 to penetrate the front bending portion 116.

That is, as shown in FIG. 12, in an embodiment of the present disclosure, the upper fastening portion 124, the upper frame 400, the insulating connection member 450, and the front bending portion 116 are stacked in order, and the fastening member, that is, the second fastening member 472 may penetrate the stacked components from the upper fastening portion 124 to the front bending portion 116, and fix the upper fastening portion 124.

In the insulating connection member 450, at least the portion of the second fastening member 472 may be inserted into the fastening insulating portion 474 of the second fastening hole 470 and may be coupled to the second fastening hole 470. The second fastening hole 470 has the fastening insulating portion 474 penetrating the second side panel 125, so that the coupling force between the insulating connection member 450 and the first side panel 115 may be strengthened, and the coupling force between the second fastening member 472 and the second fastening hole 470 may also be strengthened, thereby improving the structural stability.

In one example, as shown in FIGS. 8 and 9, in an embodiment of the present disclosure, the upper fastening portion 124 of the second front panel 122 may be penetrated by the second fastening member 472 together with the upper frame 400 to be fastened to the second fastening hole 470.

FIG. 12 shows a cross-section of the upper fastening portion 124, the upper frame 400, the insulating connection member 450, and the front bending portion 116 of the first side panel 115 penetrated by the fastening member, that is, the second fastening member 472 to be coupled to each other in a state of being stacked with each other.

The upper fastening portion 124 may be overlapped with the upper frame 400 and the insulating connection member 450 in the front and rear direction X, and the second fastening member 472 may penetrate the upper fastening portion 124 of the second front panel 122, the upper frame 400, the insulating connection member 450, and the first side panel 115 in order and be coupled to the second fastening hole 470 of the insulating connection member 450. In one example, the upper fastening portion 124 may be electrically connected to the second fastening member 472 and the upper frame 400.

Because the second front panel 122 forms a coupling relationship with each first side panel 115 by the upper fastening portion 124, the fixing force of the second front panel 122 is improved, and at the same time, the fastening structure between the first treating apparatus 10 and the second treating apparatus 20 is also advantageously reinforced.

Figure 13:
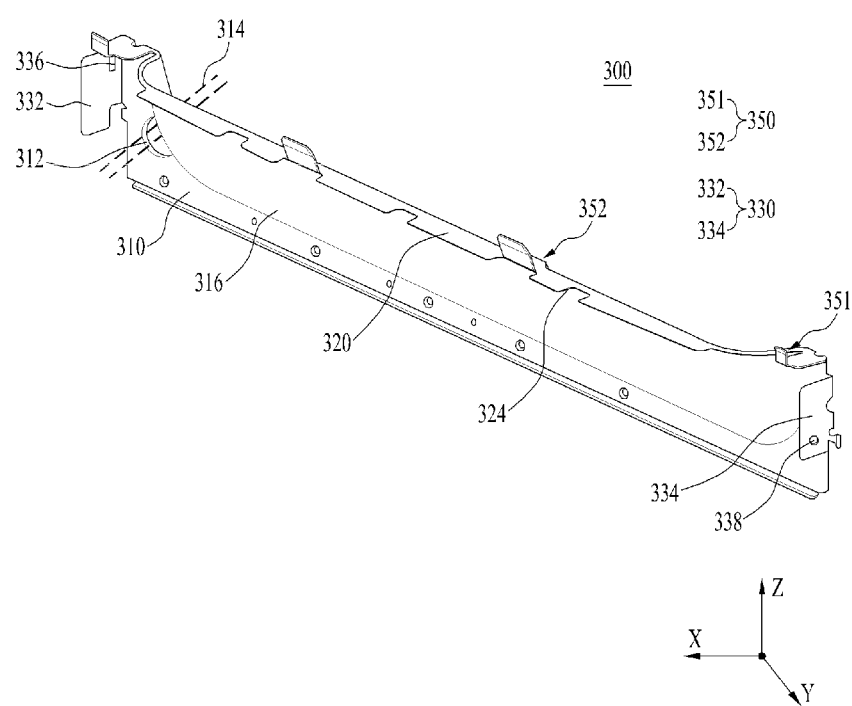
FIG. 13 is a perspective view showing a lower frame in a laundry treating apparatus according to an embodiment of the present disclosure.

In one example, FIG. 13 shows the lower frame 300 according to an embodiment of the present disclosure. FIG. 4 shows the lower frame 300 disposed at the lower front side of the first treating apparatus 10. FIG. 8 shows the lower frame 300 coupled to the first treating apparatus 10 at a position above the upper fastening portion 124, and FIG. 9 shows the lower frame 300 of FIG. 8 separated from the first side panel 115 of the first treating apparatus 10.

Referring to, for example, FIGS. 4 and 13, in an embodiment of the present disclosure, in the laundry treating apparatus 1 according to an embodiment of the present disclosure, the first treating apparatus 10 may further include the lower frame 300. The lower frame 300 may be coupled to the control panel 200 at the rear of the control panel 200 to fix the control panel 200.

The lower frame 300 may be constructed to be coupled to and fix the control panel 200 inserted between the first front panel 112 and the second front panel 122. The lower frame 300 may be disposed beneath the first front panel 112 and may be disposed at the rear of the control panel 200.

That is, the lower frame 300 may be located beneath the first front panel 112, may be located in front of the first side panel 115, and may be disposed at the rear of the control panel 200 and coupled to the control panel 200.

The lower frame 300 may be coupled with the control panel 200 while being fixed to the first treating apparatus 10. There may be various schemes of coupling with the control panel 200. For example, the side face 240 of the control panel 200 may be coupled with side end extensions 330 of the lower frame 300 to fix the control panel 200.

Referring to FIG. 4, in an embodiment of the present disclosure, both side faces in the left and right direction Y of the lower frame 300 may be respectively coupled to the first side panels 115 respectively facing toward the both side faces of the lower frame 300.

The both side faces in the left and right direction Y of the lower frame 300 may be respectively coupled to the first side panels 115. The lower frame 300 may be disposed at the lower portion of the front face of the first treating apparatus 10, and the both side faces in the left and right direction Y thereof may respectively face toward the first side panels 115 at the rear of the first side panels 115.

The lower frame 300 may be coupled to the front bending portions 116 of the first side panels 115. As for a coupling scheme, various schemes such as screw coupling, rivet coupling, fitting coupling, and the like may be used.

In an embodiment of the present disclosure, the lower frame 300 has the both side faces in the left and right direction Y respectively coupled to the first side panels 115, and the control panel 200 disposed at the front is coupled to the lower frame 300, so that the control panel 200 that may be connected with the first treating apparatus 10 and the second treating apparatus 20 between the first front panel 112 and the second front panel 122 may have the stable fixing structure.

In one example, referring to FIG. 13, in an embodiment of the present disclosure, the lower frame 300 may include a main frame face 310. The main frame face 310 extends along the left and right direction Y of the first treating apparatus 10 and may divide an interior of the first treating apparatus 10 from the control panel 200.

For example, the main frame face 310 of the lower frame 300 may be disposed in parallel with the front face 210 of the control panel 200. The main frame face 310 may extend in left and right direction Y, so that both ends thereof may be respectively coupled to the first side panels 115.

The main frame face 310 may be disposed between the interior of the first treating apparatus 10 and an interior of the control panel 200 to divide the interior of the first treating apparatus 10 from the interior of the control panel 200. Inside the first treating apparatus 10, various internals may be arranged, and there may be a large amount of water or a high-temperature air current as needed. In a process of using the first treating apparatus 10, unintended leak may occur, or the air current may affect the process.

Accordingly, an embodiment of the present disclosure may minimize influence of the water or a temperature change inside the first treating apparatus 10 on the control panel 200 because the lower frame 300 includes the main frame face 310 that divides the control panel 200 from the interior of the first treating apparatus 10.

The main frame face 310 may have various shapes as appropriate, and as described later, may include a convex portion 316 to secure a space in which the internals of the first treating apparatus 10 are arranged and effectively divide the control panel 200 from the interior of the first treating apparatus 10.

In one example, in an embodiment of the present disclosure, a connection hole 312 may be defined at the main frame face 310, and configured to allow a signal connection line 314 to pass through for operationally or electrically connecting the first treating apparatus 10 with the control panel 200.

The above-described electric parts 224 may be arranged inside the control panel 200, and the electric parts 224 may be connected to a sensor, a motor, the controller of first treating apparatus 10, or the like disposed inside the first treating apparatus 10.

To this end, the signal connection line 314 may extend from the interior of the first treating apparatus 10 to the electric parts 224 of the control panel 200, and signal connection between components of the first treating apparatus 10 and the control panel 200 may be achieved by the signal connection line 314.

In one example, the control panel 200 may be fixed by the lower frame 300, and the lower frame 300 may include the main frame face 310 that divides the control panel 200 from the interior of the first treating apparatus 10, so that the connection hole 312 through which the signal connection line 314 may pass may be defined in the main frame face 310.

Figure 15:
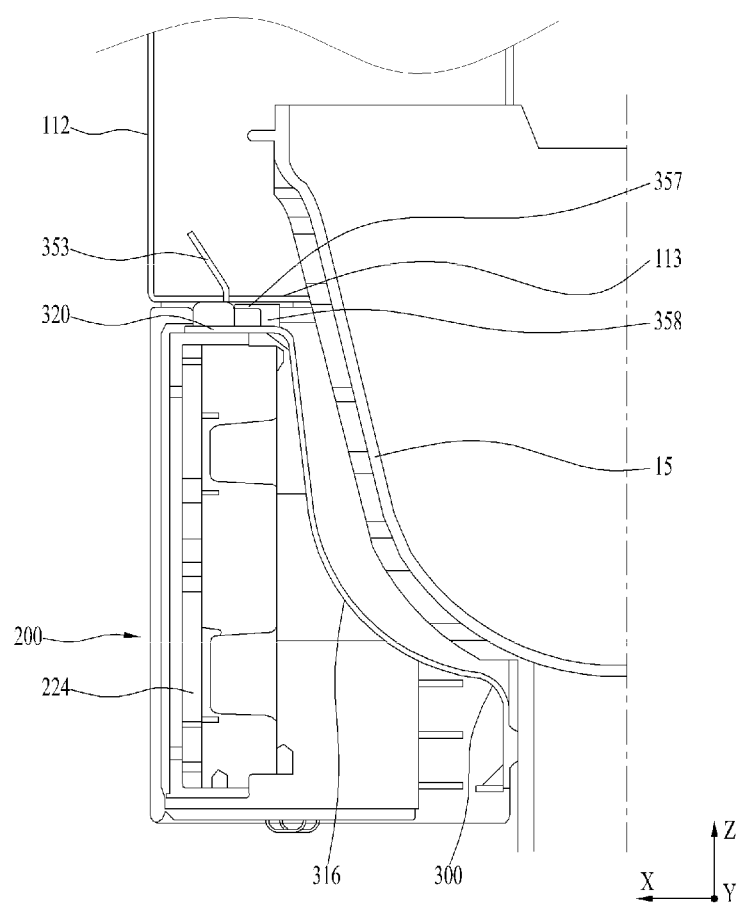
FIG. 15 is a cross-sectional view of a lower frame and a control panel viewed from the side in a laundry treating apparatus according to an embodiment of the present disclosure.

A signal connection line 314 may have various shapes. For example, the signal connection line 314 may include a connection jack or a connection port, and may be connected to the electric parts 224 through the connection hole 312. FIG. 15 shows the lower frame 300 dividing the electric parts 224 and the interior of the first treating apparatus 10 from each other according to an embodiment of the present disclosure.

There may also be various positions and shapes of the connection hole 312. Referring to FIG. 13, the connection hole 312 may be defined on one side in the left and right direction Y of the main frame face 310, and may be defined on a lower side of said one side, so that the signal connection line 314 may be effectively connected to the electric parts 224.

Figure 14:
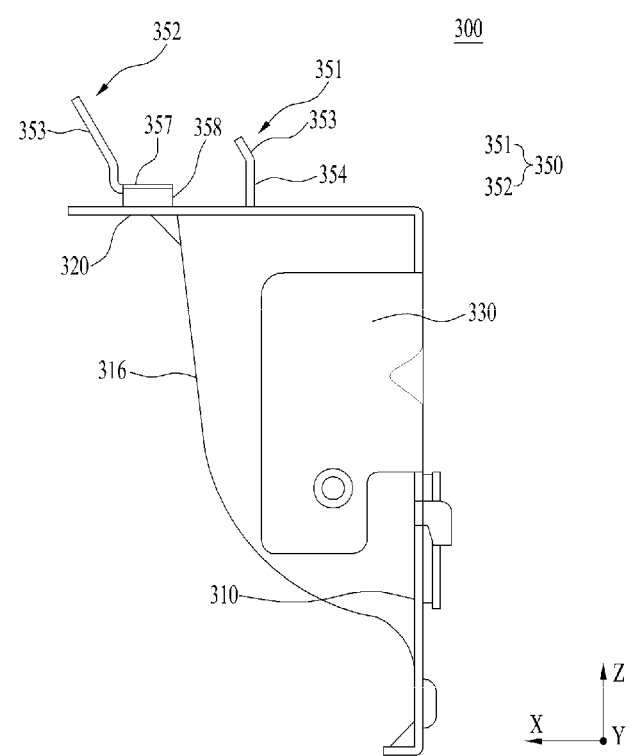
FIG. 14 is a side view showing a lower frame in a laundry treating apparatus according to an embodiment of the present disclosure.

In one example, FIG. 14 shows a side view of the lower frame 300 according to an embodiment of the present disclosure. Referring to FIGS. 13 to 14, in an embodiment of the present disclosure, the lower frame 300 may further include an upper end extension 320 and a top coupling portion 350.

The upper end extension 320 may extend forward from an upper end of the main frame face 310, and the top coupling portion 350 may protrude upward from the upper end extension 320 and be coupled to the bottom of the first front panel 112.

The upper end extension 320 may extend forward from the upper end of the main frame face 310 and may be positioned below the first front panel 112. The upper end extension 320 may extend along the left and right direction Y like the main frame face 310, and may extend forward from the main frame face 310.

The top coupling portion 350 may be disposed on the upper end extension 320. The top coupling portion 350 may protrude upward from the upper end extension 320 positioned below the first front panel 112 and may be coupled to the bottom of the first front panel 112.

There may be various numbers, positions, and shapes of the top coupling portion 350 or schemes of coupling with the first front panel 112 as needed. The top coupling portion 350 may include a panel insertion portion 353 inserted into the lower end bending portion 113.

The lower end bending portion 113 may be disposed in parallel with the upper end extension 320, and the top coupling portion 350 may include a panel insertion portion 353 protruding toward the lower end bending portion 113 to penetrate the lower end bending portion 113.

The panel insertion portion 353 may penetrate the lower end bending portion 113 of the first front panel 112 and may be inserted into the bottom of the first front panel 112. The top coupling portion 350 may be coupled to the first front panel 112 as the panel insertion portion 353 penetrates and is inserted into the lower end bending portion 113.

In an embodiment of the present disclosure, the lower frame 300 is fixed by being coupled with each first side panel 115, fixes the control panel 200 by being coupled to the control panel 200 at the front, is coupled to the first front panel 112 through the upper end extension 320, and supports the first front panel 112, thereby effectively improving structural stability of the laundry treating apparatus 1 according to an embodiment of the present disclosure.

In one example, FIG. 15 is a cross-sectional view showing a state in which the lower frame 300, the control panel 200, and the first front panel 112 are fastened to each other.

Referring to FIGS. 14 to 15, in an embodiment of the present disclosure, at least a portion of the panel insertion portion 353 may extend in an inclined manner such that an upper end thereof is positioned forwardly of a lower end thereof.

That is, the panel insertion portion 353 may be formed to be inclined forward upwardly. An inclined portion of the panel insertion portion 353 may be formed on an entirety of or only a portion of the panel insertion portion 353.

As the panel insertion portion 353 extends in the inclined manner, the upper end thereof is disposed close to the front face of the first treating apparatus 10. Accordingly, the lower end bending portion 113 of the first front panel 112 is moved rearward, so that the panel insertion portion 353 may be easily inserted, and fixation of the first front panel 112 into which the panel insertion portion 353 may be strengthened.

In one example, the top coupling portion 350 may further include an ascending extension 354. The ascending extension 354 may extend from the upper end extension 320 toward the lower end bending portion 113. In addition, the panel insertion portion 353 may be disposed at an upper end of the ascending extension 354 to penetrate the lower end bending portion 113.

The first front panel 112, for example, the lower end bending portion 113 of the first front panel 112 and the upper end extension 320 may be spaced apart from each other. The top face 220 of the control panel 200 may be inserted between the upper end extension 320 and the first front panel 112.

The top coupling portion 350 may include the ascending extension 354 extending upward from the upper end extension 320, and the panel insertion portion 353 extending from the ascending extension 354 may be inserted into the first front panel 112.

The top coupling portion 350 may include a first top fastening portion 351 and a second top fastening portion 352. The ascending extension 354 may be included in the first top fastening portion 351. That is, in the first top fastening portion 351, the ascending extension 354 extending from the upper end extension 320 may extend to the lower end bending portion 113 of the first front panel 112, and the panel insertion portion 353 may be disposed on the upper end of the ascending extension 354 and be inserted into the first front panel 112 through the lower end bending portion 113.

There may be various shapes or extension directions of the ascending extension 354, and FIG. 14 shows the plate-shaped panel insertion portion 353 extending in an inclined manner forward from the upper end of the plate-shaped ascending extension 354 according to an embodiment of the present disclosure.

In one example, in an embodiment of the present disclosure, the top coupling portion 350 may include a top support, and the panel insertion portion 353 may be disposed on the top support. For example, in an embodiment of the present disclosure, the top coupling portion 350 may include a second top coupling portion 352, the second top coupling portion 352 may include the top support, and the panel insertion portion 353 may be disposed on the top support.

For example, the top support may be disposed on the upper end extension 320 and support the lower end bending portion 113. That is, the top support may be constructed such that an upper end thereof is in contact with the lower end bending portion 113 and supports the lower end bending portion 113 upward.

The top support may have a face for supporting the lower end bending portion 113 or may be formed in a protrusion shape to be in contact with the lower end bending portion 113.

When the top support is disposed on the top coupling portion 350, for example, in a case of the second top coupling portion 352 including the top support, the panel insertion portion 353 may be disposed on the top support to penetrate the lower end bending portion 113.

That is, the second top coupling portion 352 may be disposed such that the top support is in contact with the lower end bending portion 113 on the upper end extension 320, and the panel insertion portion 353 may be disposed to protrude upward from the top support in contact with the lower end bending portion 113 to penetrate the lower end bending portion 113.

As above, in an embodiment of the present disclosure, the top coupling portion 350 is constructed to include the top support supporting the lower end bending portion 113, so that the bottom of the first front panel 112 may be supported upward by the lower frame 300 and may be structurally stabilized.

In one example, as shown in FIG. 14, the top support may include a top support face 357 that is spaced upwardly from the upper end extension 320, and is disposed to be in parallel with the lower end bending portion 113 and supports the lower end bending portion 113, and the panel insertion portion 353 may extend from the top support face 357.

The top support face 357 may be disposed to be in parallel with the lower end bending portion 113, and may be disposed to be in parallel with the upper end extension 320. That is, the top support face 357 may be in a form offset upward from the upper end extension 320.

The top support face 357 may be preferably in a face-contact with a bottom face of the lower end bending portion 113 to support the first front panel 112.

In addition, in an embodiment of the present disclosure, the top support may further include a top connection portion 358 connecting the top support face 357 and the upper end extension 320 with each other, and the panel insertion portion 353 may be disposed on a front end of the top support face 357 and at least partially extend in an inclined manner such that an upper end thereof is positioned forward of a lower end thereof.

The top support face 357 may be formed in a plate shape and may be disposed in parallel with the lower end bending portion 113, and may have a connection relationship with the upper end extension 320 by the top connection portion 358. That is, in the top support and the top support face 357 may be connected to the upper end extension 320 by the top connection portion 358.

In one example, in a case of the second top coupling portion 352 having the top support, the panel insertion portion 353 may extend upward from the front end, that is, a front edge, of the top support face 357. Accordingly, the first front panel 112 may be supported on the top support face 357 while being moved rearward on the top of the lower frame 300, and the panel insertion portion 353 may penetrate and be coupled to the lower end bending portion 113.

In addition, the top connection portion 358 may be formed at both side edges and a rear edge of the top support face 357 to stably fix the top support face 357 to the upper end extension 320.

In an embodiment of the present disclosure, the top coupling portion 350 includes a first top fastening (coupling) portion 351 having the ascending extension 354 and coupled to the first front panel 112, and a second top coupling portion 352 that supports and fixes the first front panel 112, thereby efficiently providing a coupling strength and a support strength between the first front panel 112 and the lower frame 300. The numbers and positions of the first top fastening portion 351 and the second top coupling portion 352 may be variously determined as needed.

In one example, as shown in FIGS. 13 to 14, in the laundry treating apparatus 1 according to an embodiment of the present disclosure, the lower frame 300 may include the side end extensions 330, and the side end extensions 330 may respectively extend forward from both sides of the lower frame 300 to be coupled to the control panel 200.

As described above, the lower frame 300 has the main frame face 310 that divides the control panel 200 from the interior of the first treating apparatus 10, and may include the upper end extension 320 to support and fix the bottom of the first front panel 112.

Furthermore, an embodiment of the present disclosure includes the side end extensions 330 respectively extending forward from both sides in the left and right direction Y of the main frame face 310, so that the lower frame 300 may be coupled with the first front panel 112 upward, and at the same time, may be coupled with the control panel 200 in the front through the side end extensions 330, thereby enabling efficient space utilization and realizing a coupling structure.

The side end extension 330 may include a first side end extension 332 disposed on one side in the left and right direction Y of the lower frame 300 and a second side end extension 334 disposed on the other side in the left and right direction Y of the lower frame 300.

In addition, as shown in FIG. 13, in an embodiment of the present disclosure, the first side end extension 332 may include a hook inserting portion 336 into which a side face hook 246 disposed on the control panel 200 is inserted, and the second side end extension 334 may include a through hole 338 coupled with a penetrating member 248 penetrating the control panel 200. FIG. 11 is a view of the first side end extension 332 including the hook inserting portion 336 viewed from the rear.

The first side end extension 332 includes the hook inserting portion 336 into which the side face hook 246 disposed on the control panel 200 is inserted. The control panel 200 may include a first side face 242 on one side in the left and right direction Y, and may include the side face hook 246 disposed inside the first side face 242.

For example, the first side end extension 332 may be disposed on one side in the left and right direction Y of the main frame face 310 to face toward an inner face of the first side face 242, and the side face hook 246 may be disposed between the first side face 242 and the first side end extension 332.

The side face hook 246 may protrude toward the first side end extension 332 and be inserted into the hook inserting portion 336 of the first side end extension 332, so that the control panel 200 may be fixed to the lower frame 300.

The side face hook 246 may protrude from one side in the left and right direction Y of the control panel 200 toward the other side and may be inserted into the first side end extension 332 of the lower frame 300.

In one example, in an embodiment of the present disclosure, the control panel 200 may further include a hook extension 247. The hook extension 247 may extend rearward from the front face 210, may be located between the first side face 242 and the first side end extension 332, may be spaced apart from the first side face 242, and may have the side face hook 246 at an extended end thereof.

The hook extension 247 may extend rearward from the rear face of the front face 210 of the control panel 200, and may be spaced apart from the inner face of the first side face 242, that is, one face of the first side face 242 facing toward the other side in the left and right direction Y of the control panel 200.

As the side face hook 246 and the hook extension 247 are arranged between the first side face 242 of the control panel 200 and the first side end extension 332 of the lower frame 300, and as the side face hook 246 is disposed on an end of the hook extension 247 spaced apart from the first side face 242, in an insertion process of the control panel 200, the hook extension 247 may be bent and deformed as needed such that the side face hook 246 is inserted into the hook inserting portion 336.

For example, when the hook extension 247 is in close contact with the first side face 242 or when the side face hook 246 is disposed on the inner face of the first side face 242, in the insertion process of the control panel 200, the first side face 242 itself of the control panel 200 deforms in a process in which the side face hook 246 reaches the hook inserting portion 336 of the first side end extension 332, resulting in inconvenience in the coupling or a damage.

However, in an embodiment of the present disclosure, as the side face hook 246 is disposed on the hook extension 247 spaced apart from the first side face 242, in the process of coupling the control panel 200 and the lower frame 300 with each other, the hook extension 247 is partially bent and the side face hook 246 is moved toward the hook inserting portion 336, so that effective coupling may be achieved.

In one example, the control panel 200 may have the second side face 244 disposed on the other side in the left and right direction Y, and the side end extension 330 may further include the second side end extension 334. The second side end extension 334 may be disposed on the other side in the left and right direction Y of the main frame face 310 to face toward the inner face of the second side face 244.

The second side face 244 of the control panel 200 may be penetrated by the penetrating member 248, and the second side end extension 334 of the lower frame 300 positioned on the inner face of the second side face 244 may include the through hole 338 into which the penetrating member 248 is coupled. FIG. 5 shows the penetrating member 248 that penetrates through the second side face 244 of the control panel 200 and is coupled to the through hole 338 defined in the second side end extension 334 of the lower frame 300.

The through hole 338 may be penetrated by the penetrating member 248 like the second side face 244, or may be coupled to the penetrating member 248 as the penetrating member 248 penetrated the second side face 244 is inserted thereto. The penetrating member 248 may have various shapes such as a screw shape, a rivet shape, or the like.

In an embodiment of the present disclosure, the first side end extension 332 of the lower frame 300 is coupled with the first side face 242 of the control panel 200 through the hook inserting portion 336, and the second side end extension 334 of the lower frame 300 is coupled with the second side face 244 of the control panel 200 through the through hole 338, so that assembly efficiency may be improved and a structure having excellent coupling stability may be implemented.

For example, if both the first side end extension 332 and the second side end extension 334 of the lower frame 300 were coupled with the control panel 200 in a hooked manner through the hook inserting portion 336, such hooked coupling, compared to the coupling using the penetrating member 248, would decrease the coupling stability and make it difficult to separate the control panel 200 when necessary.

In addition, if both the first side end extension 332 and the second side end extension 334 of the lower frame 300 were coupled with the control panel 200 using the penetrating member 248, there would be no means for fixing the control panel 200 at an appropriate position for coupling with the lower frame 300, and additional process and component would be disadvantageously required for the assembly process.

Accordingly, in an embodiment of the present disclosure, the first side face 242 of the control panel 200 and the first side end extension 332 of the lower frame 300 are coupled with each other through the side face hook 246 and the hook inserting portions 336, so that the position of the control panel 200 at the beginning of the coupling of the control panel 200 may be effectively fixed.

In addition, the second side face 244 of the control panel 200 and the second side end extension 334 of the lower frame 300 are coupled with each other through the penetrating member 248 and the through hole 338 in a penetrating manner, thereby maintaining a stable coupling structure that makes coupling and separation easy.

Referring again to FIGS. 13 to 15, in an embodiment of the present disclosure, the main frame face 310 of the lower frame 300 may include the convex portion 316 that is curved such that a front face of the convex portion 316 is convex and a rear face of the convex portion 316 is concave to define a space at the rear.

The convex portion 316 may have a shape extending along the left and right direction Y of the lower frame 300 so as to be parallel with a longitudinal direction of the main frame face 310. In addition, as the front face of the convex portion 316 is convex and the rear face thereof is concave, the space is secured at the rear, so that the convex portion 316 and the components inside the first treating apparatus 10 do not interfere with each other.

FIG. 15 shows a state in which a base cabinet 15 of the first treating apparatus 10 is disposed at the rear of the main frame face 310 of the lower frame 300 according to an embodiment of the present disclosure. FIG. 8 shows that the convex portion 316 of the main frame face 310 is bent so as to correspond to the base cabinet 15, and thus, a space in which the base cabinet 15 is disposed is secured without interference between the base cabinet 15 and the lower frame 300 located at the rear. The base cabinet 15 may correspond to the first bottom panel of the first treating apparatus 10 or may be a component included in the first bottom panel.

The convex portion 316 may be formed to include the top of the main frame face 310, and the upper end extension 320 may extend from the convex portion 316. That is, the convex portion 316 may have a shape in which the space defined at the rear is opened upward.

The convex portion 316 may extend downward from the upper end of the main frame face 310 and may extend along the left and right direction Y. The connection hole 312 may be defined in the convex portion 316 or may be positioned avoiding the convex portion 316.

Because the lower frame 300 has the shape in which the convex portion 316 is formed on the top of the main frame face 310 and the space defined at the rear is opened upward, a space may be effectively secured for positioning the base cabinet 15 and the like at the rear of the lower frame 300, and a support strength of the first front panel 112 supported by the upper end extension 320 may be effectively improved.

In one example, as described above, the lower frame 300 may include the top coupling portion 350, and in an embodiment of the present disclosure, the top face 220 of the control panel 200 may have a coupling portion receiving groove 269 into which the top coupling portion 350 of the lower frame 300 is inserted and received.

FIG. 5 shows the control panel 200 that is coupled with the lower frame 300, so that the top coupling portion 350 is positioned within the coupling portion receiving groove 269.

For example, in an embodiment of the present disclosure, the top face 220 of the control panel 200 may be inserted between the lower end bending portion 113 and the upper end extension 320, and as described above, the upper end extension 320 may include the top coupling portion 350 protruding upward and inserted into the lower end bending portion 113.

In addition, the top face 220 may include the coupling portion receiving groove 269 that is opened rearward, and the top coupling portion 350 is inserted into the coupling portion receiving groove 269 from the rear.

The coupling portion receiving groove 269 may have a shape extending in the front and rear direction X in consideration of an insertion direction of the control panel 200, and a width of the coupling portion receiving groove 269 may be greater than that of the top coupling portion 350. A rear end of the coupling portion receiving groove 269 may be disposed to face toward the top coupling portion 350 and opened rearward, so that the top coupling portion 350 may be inserted into the coupling portion receiving groove 269 through the open rear end of the coupling portion receiving groove 269.

That is, in the process in which the control panel 200 in front of the lower frame 300 is moved rearward and inserted, the top coupling portion 350 of the lower frame 300 may move forward from the rear of the coupling portion receiving groove 269 and be inserted into the coupling portion receiving groove 269.

Accordingly, the upper end extension 320 having the top coupling portion 350 coupled to the first front panel 112 and supporting the first front panel 112 is included in the lower frame 300. In the structure in which the top face 220 of the control panel 200 is inserted between the upper end extension 320 and the lower end bending portion 113 of the first front panel 112, the top coupling portion 350 protruding from the upper end extension 320 of the lower frame 300 toward the lower end bending portion 113 may be positioned without structural interference by the coupling portion receiving groove 269. In addition, the top face 220 of the control panel 200 may also be inserted between the first front panel 112 and the upper end extension 320 of the lower frame 300 without interference by the top coupling portion 350.

In one example, in an embodiment of the present disclosure, the control panel 200 may further include the electric parts 224 and the electric parts coupling portion 228, and the upper end extension 320 of the lower frame 300 may include a front receiving groove 324 into which the electric parts coupling portion 228 is inserted and received.

In one example, FIG. 6 shows the electric parts coupling portion 228 protruding inward from the top face of the control panel 200, FIG. 7 shows the electric parts 224 inside the control panel 200 and the electric parts coupling portion 228 protruding downward from the inner face of the top face 220 of the control panel 200, and FIG. 13 shows the lower frame 300 having the front receiving groove 324 defined therein.

The electric parts coupling portion 228 may protrude downward from the inner face of the top face 220 and may be coupled to the electric parts 224 inside the control panel 200. The electric parts coupling portion 228 may include a plurality of electric parts coupling portions. The electric parts coupling portion 228 may have a protrusion shape as shown in FIG. 6 and be inserted into and coupled to a groove defined in the electric parts 224, or may be disposed to rearwardly support a rear face of the electric parts 224 as shown in FIG. 7.

In one example, the upper end extension 320 of the lower frame 300 may be located below the top face 220 of the control panel 200, and thus, in the insertion process of the control panel 200, the electric parts coupling portion 228 may be in contact with a front end of the upper end extension 320 and interfere with the movement of the control panel 200.

Accordingly, in an embodiment of the present disclosure, as shown in FIG. 13, the front receiving groove 324 into which the electric parts coupling portion 228 is inserted and received may be defined at the front end of the upper end extension 320.

The front receiving groove 324 may be defined to face toward the electric parts coupling portion 228. That is, the front receiving groove 324 may be located at the rear of the electric parts coupling portion 228. The front receiving groove 324 may extend in the front and rear direction X in consideration of the coupling direction of the control panel 200, and a front end of the front receiving groove 324 may be opened forward.

In the process in which the control panel 200 is inserted between the first front panel 112 and the second front panel 122, the electric parts coupling portion 228 may be inserted into the front receiving groove 324 through the open front end of the front receiving groove 324.

In one example, as shown in FIGS. 6 to 7, in an embodiment of the present disclosure, a length of the top face 220 of the control panel 200 extending rearward from the front face 210 may be less than a length of the bottom face 230 extending rearward from the front face 210, so that the interference with the upper end extension 320 of the lower frame 300 may be prevented.

As described above, the top face 220 of the control panel 200 may be disposed adjacent to the upper end extension 320 of the lower frame 300 in the vertical direction Z. The upper end extension 320 of the lower frame 300 has the top coupling portion 350 coupled to the first front panel 112, and the top face 220 of the control panel 200 may have the electric parts coupling portion 228.

As such, the upper end extension 320 of the lower frame 300 and the top face 220 of the control panel 200 may respectively have components configured for coupling and supporting each other between them or for coupling and supporting with respect to the first front panel 112, which may cause the structural interference therebetween.

In consideration of the above structural features, in an embodiment of the present disclosure, the top face 220 of the control panel 200 is formed to have a smaller length than the bottom face 230, so that the structural interference between the upper end extension 320 of the lower frame 300 and the top face 220 of the control panel 200 may be prevented, and structural degrees of freedom therebetween may be effectively improved.

In one example, as described above, in an embodiment of the present disclosure, the top face fastening elastic portion 266 may be disposed on the top face 220 of the control panel 200, and the bottom face fastening elastic portion 267 may be disposed on the bottom face 230 of the control panel 200.

In addition, referring to FIG. 6, in an embodiment of the present disclosure, the top face fastening elastic portion 266 may be disposed to intersect the top face opening 263 along the left and right direction Y of the control panel 200, and the bottom face fastening elastic portion 267 may be disposed to intersect the bottom face opening 264 along the front and rear direction X of the control panel 200.

That is, the top face fastening elastic portion 266 may extend along the left and right direction Y of the control panel 200, and the bottom face fastening elastic portion 267 may extend along the front and rear direction X of the control panel 200. The top face opening 263 may also extend in the left and right direction Y like the top face fastening elastic portion 266, and the bottom face opening 264 may also extend in the front and rear direction X like the bottom face fastening elastic portion 267.

As described above, at least a portion of the upper end extension 320 of the lower frame 300 overlaps the top face 220 of the control panel 200 and has a coupling relationship with the first front panel 112 and the like, so that the top face 220 of the control panel 200 may have a length of extending from the front face 210 that is smaller than that of the bottom face 230 to minimize the structural interference with the upper end extension 320.

Accordingly, the top face fastening elastic portion 266 disposed on the top face 220 has a disadvantage in extending in the front and rear direction X because of the small length of the top face 220. Accordingly, the top face fastening elastic portion 266 may extend in the left and right direction Y of the control panel 200. The top face opening 263 may also extend in the left and right direction Y like the top face fastening elastic portion 266.

In addition, because of the characteristics of the bottom face 230 having the larger extension length compared to the top face 220, the bottom face fastening elastic portion 267 disposed on the bottom face 230 may extend in the front and rear direction X unlike the top face fastening elastic portion 266, and the bottom face opening 264 may also extend in the front and rear direction X like the bottom face fastening elastic portion 267. The panel fastening portion 260 may protrude upward from the top face fastening elastic portion 266 and may protrude downward from the bottom face fastening elastic portion.

In one example, referring to FIG. 5 again, the laundry treating apparatus 1 according to an embodiment of the present disclosure may have a drain passage 270 extending in the left and right direction Y on the top face 220 of the control panel 200.

The drain passage 270 may extend along the left and right direction Y on the top face 220, and water falling to the top face 220 may be drained by flowing in the left and right direction Y along the drain passage 270.

For example, as described above, the water may exist inside the first treating apparatus 10 and the second treating apparatus 20, such as a washing machine or a condensing dryer, and the water may leak or may be generated in other operating situations of the first treating apparatus 10.

The water may fall along the first treating apparatus 10 or may be supplied to the control panel 200 in other schemes. As described above, the control panel 200 may have the display and the manipulation unit on the front face thereof, and may have the electric parts 224 therein. Therefore, it is desired to prevent the water existing on the control panel 200 from flowing into the control panel 200 or flowing along the front face 210.

Accordingly, an embodiment of the present disclosure may form the drain passage 270 on the top face 220 of the control panel 200, and the inflow of the water supplied to the top face 220 of the control panel 200 to the front face 210 or the interior of the control panel 200 may be minimized through the drain passage 270.

In addition, because the control panel 200 is located below the first front panel 112, in consideration of the situation in which the water flowing downward along the first front panel 112 falls onto the top face 220 of the control panel 200, in an embodiment of the present disclosure, the drain passage 270 may be formed on the top face 220 of the control panel 200.

The drain passage 270 may be formed in various shapes, and may be formed in various schemes as appropriate. FIG. 12 shows a state in which the drain passage 270 opened upward is disposed on the top face 220 according to an embodiment of the present disclosure.

The drain passage 270 may extend along the left and right direction Y of the control panel 200. Accordingly, the water falling onto the top face 220 may flow in the left and right direction Y on the top face 220, and a phenomenon in which the water passes the rear end of the top face 220 and flows into the control panel 200 or flows along the front face 210 of the control panel 200 may be suppressed.

In one example, referring to FIG. 5, in an embodiment of the present disclosure, the drain passage 270 may be formed by the upper end of the front face 210 and the passage rib.

For example, the top face 220 of the control panel 200 may extend rearward from the upper end of the front face 210, and the upper end of the front face 210 may be positioned higher than the top face 220. That is, the top face 220 may extend rearward from the front face 210 at a vertical level lower than that of the upper end of the front face 210. In other words, the front face 210 may extend upward such that the upper end is positioned higher than the top face 220.

In addition, the passage rib protruding upward and extending along the left and right direction Y may be disposed at the rear end of the top face 220. The top face 220 may extend in the left and right direction Y of the control panel 200 like the front face 210, and the passage rib may also extend in the left and right direction Y along the top face 220.

In addition, as described above, the top face 220 may have the coupling portion receiving groove 269 defined therein that is opened rearward at the rear end thereof. A specific extending shape of the passage rib may correspond to a shape of the rear end of the top face 220. That is, the passage rib may extend along the rear end of the top face 220.

The drain passage 270 may be formed on the top face 220 by the upper end and the passage rib of the front face 210.

That is, the upper end of the front face 210 may form one side wall of the drain passage 270, the passage rib may form an opposite side wall to said one side wall of the drain passage 270, and the top face of the top face 220 may form a bottom face of the drain passage 270 to form the drain passage 270.

In an embodiment of the present disclosure as above, the drain passage 270 may be formed on an entirety of the top face of the top face 220. Accordingly, the water falling onto or flowing to the top face 220 may be entirely located in the drain passage 270, or may be drained by flowing in the left and right direction Y along the drain passage 270.

In one example, in an embodiment of the present disclosure, an upper end of each side face 240 of the control panel 200 may be located above the top face 220, and both ends of the passage rib in the left and right direction Y may be respectively spaced apart from the side faces 240 respectively facing thereto, so that each drainage may be defined between the upper end of each side face 240 and the passage rib.

For example, each side face 240 extending rearward from each of both sides in the left and right direction Y of the front face 210 has the upper end positioned higher than the top face 220 like the front face 210. The upper end of the front face 210 and the upper end of the side face 240 may extend integrally. Accordingly, the top face 220 may be disposed such that the front end and both side ends thereof are surrounded by the upper end of the front face 210 and the upper end of the side face 240.

Both side ends of the passage rib in the left and right direction Y may be respectively spaced apart from the upper ends of the side faces 240 respectively facing thereto. That is, in the drain passage 270, an opening may be defined between each side end of the passage rib and the upper end of each side face 240 to define the drainage. The water present on the top face 220 may be discharged from the top face 220 through the drainage 276.

In one example, both sides in the left and right direction Y of the electric parts 224 that may be arranged inside the control panel 200 may be respectively spaced apart from the inner faces of the side faces 240 by a predetermined distance so as to be prevented from contacting the water discharged through the drainage.

As above, by the drain passage 270 defined by the upper end of the front face 210 and the upper ends of the side faces 240, the water falling on the top face 220 may be prevented from leaking to the outside along the front face 210 or the side faces 240, and may be discharged rearward from the both sides in the left and right direction Y of the control panel 200 through the drainages respectively defined between the passage rib and the side faces 240.

In addition, as shown in FIG. 5, the panel support 268 and the panel fastening portion 260 arranged on the top face 220 of the control panel 200 may be located in the drain passage 270. As described above, the panel support 268 may be disposed on the drain passage 270 to support the lower end bending portion 113 of the first front panel 112, and the panel fastening portion 260 may be disposed on the drain passage 270 and penetrate the lower end bending portion 113.

The panel support 268 and the panel fastening portion 260 may respectively include a plurality of panel supports and a plurality of panel fastening portions, may be arranged in left and right direction Y along the drain passage 270, and may be arranged to alternate with each other. Accordingly, a supporting force of the first front panel 112 by the panel support 268 and a fixing force of the first front panel 112 by the panel fastening portion 260 may be properly mixed and dispersed.

In one example, in an embodiment of the present disclosure, the top face 220 may further include an inflow prevention rib 274. The inflow prevention rib 274 may extend to surround the opening 262 defined in the top face 220 and protrude upward to prevent the water from flowing into the opening 262. The opening 262 may be the top face opening 263 on which the top face fastening elastic portion 266 is disposed.

The panel fastening portion 260 may be disposed in the drain passage 270 and may be disposed on the fastening elastic portion 265 disposed with the opening 262. That is, the opening 262 on which the fastening elastic portion 265 is formed may be defined in the drain passage 270, and the water on the top face 220 may fall into the control panel 200 through the opening 262.

Accordingly, in an embodiment of the present disclosure, the inflow prevention rib 274 surrounding the opening 262 may be formed on the top face 220 to prevent the water leakage through the opening 262.

The inflow prevention rib 274 may extend in a ring shape to surround a circumference of the opening 262. The ring shape may be various depending on the shape of the opening 262, and may have, for example, a polygonal or circular cross-section.

As a result, while being prevented from flowing into the opening 262 by the inflow prevention rib 274, the water on the drain passage 270 defined by the upper end of the front face 210 and the passage rib may flow in the left and right direction Y along the drain passage 270 and be drained.

In one example, as described above, in an embodiment of the present disclosure, the coupling portion receiving groove 269 may be defined in the top face 220. The passage rib extending along the rear end of the top face 220 may be extended so as to correspond to the coupling portion receiving groove 269, so that the water leakage into the coupling portion receiving groove 269 may be prevented.

Figure 18:
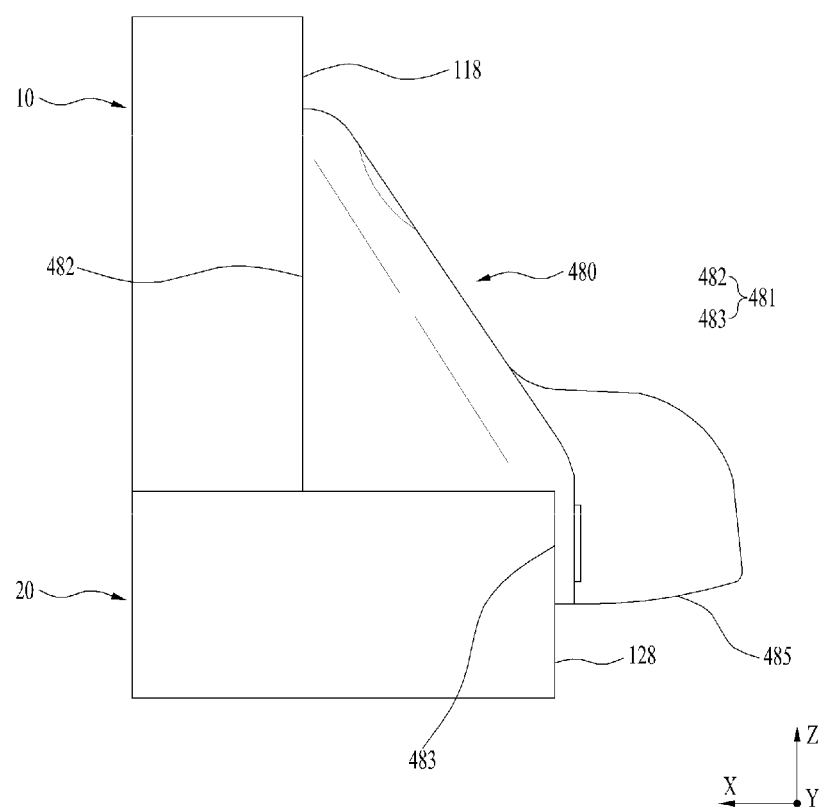
FIG. 18 is a view showing a rear bracket in a laundry treating apparatus according to an embodiment of the present disclosure viewed from the side.

In one example, FIG. 16 shows a view of the laundry treating apparatus 1 according to an embodiment of the present disclosure viewed from the rear, FIG. 17 shows a perspective view of the rear bracket 480, and FIG. 18 shows the rear bracket 480 coupled to the first treating apparatus 10 and the second treating apparatus 20 viewed at the rear.

As shown in FIGS. 16 and 18, in an embodiment of the present disclosure, the first treating apparatus 10 may have the first rear panel 118 disposed on the rear face thereof, and the second treating apparatus 20 may have the second rear panel 128 disposed on the rear face thereof. In addition, the rear bracket 480 made of an insulating material and fastening the first rear panel 118 and the second rear panel 128 with each other may be further included.

As described above, the first treating apparatus 10 and the second treating apparatus 20 may be electrically insulated from each other and coupled to each other by the insulating connection member 450 and the upper frame 400 at the front side.

Further, the first treating apparatus 10 and the second treating apparatus 20 may be electrically insulated from each other and be coupled to each other through the rear bracket 480 at the rear side.

The first treating apparatus 10 and the second treating apparatus 20 are manufactured separately from each other, and then stacked together and installed to be used together. Therefore, in order to secure the structural stability of the laundry treating apparatus 1 according to an embodiment of the present disclosure, structural fastening between the first treating apparatus 10 and the second treating apparatus 20 stacked together may be required.

Further, as described above, the first treating apparatus 10 and the second treating apparatus 20 respectively include electricity consuming devices independent of each other, such as the components like the motors, the controllers, or the like, so that it may be advantageous that the first treating apparatus 10 and the second treating apparatus 20 are electrically insulated from each other.

Accordingly, in an embodiment of the present disclosure, the first treating apparatus 10 and the second treating apparatus 20 may be fastened to each other through the upper frame 400 and the insulating connection member 450 at the front side of the first treating apparatus 10 and the second treating apparatus 20 stacked together, and may be fastened to each other through the rear bracket 480 at the rear side.

The rear bracket 480 may be made of the insulating material. For example, the rear bracket 480 may be made of the insulating material, such as a plastic material, a rubber material, or a synthetic material of the plastic and the rubber.

The rear bracket 480 may have a length parallel to the left and right direction Y, and may have a length corresponding to a width in the left and right direction Y of the first treating apparatus 10 or the second treating apparatus 20. The rear bracket 480 may be coupled with the first rear panel 118 of the first treating apparatus 10 and the second rear panel 128 of the second treating apparatus 20 together to fasten the first rear panel 118 and the second rear panel 128 with each other.

There may be various coupling schemes between the rear bracket 480, the first rear panel 118, and the second rear panel 128. For example, the rear bracket 480 may be coupled to the first rear panel 118 and the second rear panel 128 together through screws, rivets, or the like, or the hook coupling or the fitting coupling scheme may be used.

In one example, referring to FIG. 18, in an embodiment of the present disclosure, the rear bracket 480 may be coupled to the first rear panel 118 and the second rear panel 128 to support the first rear panel 118 forward.

The rear bracket 480 may fasten the first rear panel 118 and the second rear panel 128 with each other as an upper portion of the rear bracket 480 is coupled to the first rear panel 118 and a lower portion of the rear bracket 480 is coupled to the second rear panel 128.

In this connection, a front face 481 facing forward of the rear bracket 480 may have an upper end 482 in contact with the first rear panel 118, and a lower end 483 in contact with the second rear panel 128. That is, in the rear bracket 480, the upper end 482 of the front face 481 may support the first rear panel 118 from the rear, and the lower end 483 of the front face 481 may support the second rear panel 128 from the rear.

Accordingly, in a state of being disposed on the second treating apparatus 20, the first treating apparatus 10 may be supported rearward by the upper end of the second front panel 122 at the front, and may be supported forward by the rear bracket 480 at the rear, so that the position of the first treating apparatus 10 may be fixed in the front and rear direction X.

In one example, as shown in FIG. 18, in an embodiment of the present disclosure, the first rear panel 118 may be located forward of the second rear panel 128, and the front face 481 of the rear bracket 480 may be formed in a stepped manner such that the upper end 482 supporting the first rear panel 118 is located forward of the lower end 483 supporting the second rear panel 128.

In an embodiment of the present disclosure, the first rear panel 118 and the second rear panel 128 may be arranged to be spaced apart from each other in the front and rear direction X. For example, the first rear panel 118 may be located forward or rearward of the second rear panel 128. A positional relationship of the first rear panel 118 to the second rear panel 128 may be determined from a design difference between the first treating apparatus 10 and the second treating apparatus 20.

For example, when a length in the front and rear direction X of the first treating apparatus 10 is greater than that of the second treating apparatus 20, the first rear panel 118 may be located rearward of the second rear panel 128. When the length in the front and rear direction X of the first treating apparatus 10 is smaller than that of the second treating apparatus 20, the first rear panel 118 may be located forward of the second rear panel 128.

Alternatively, for an assembly advantage for stacking the first treating apparatus 10 on the second treating apparatus 20, the first rear panel 118 may be positioned in front of the second rear panel 128. For example, in the process of assembling the laundry treating apparatus 1 according to an embodiment of the present disclosure, when the second treating apparatus 20 is placed in an installation region and then the first treating apparatus 10 is lifted on the second treating apparatus 20, the first treating apparatus 10 may slide rearward from a position in front of the second treating apparatus 20 and may be disposed on the second treating apparatus 20.

In this process, the rear bracket 480 may be installed in advance on the second rear panel 128 of the second treating apparatus 20, and the first treating apparatus 10 may be disposed at an appropriate assembly position while a distance of sliding rearward is limited by the rear bracket 480.

In an embodiment of the present disclosure, the length in the front and rear direction X of the first treating apparatus 10 may be smaller than that of the second treating apparatus 20, or at least the lower portion of the first rear panel 118 may be located forward of the second rear panel 128 such that a stopper role of the rear bracket 480 may be achieved.

The front face 481 of the rear bracket 480 may have the stepped shape as shown in FIG. 18 such that the upper end 482 of the front face 481 that forwardly supports the lower portion of the first rear panel 118 is located forward of the lower end 483 that forwardly supports the upper portion of the second rear panel 128.

When the lower portion of the first rear panel 118 is located rearward of the second rear panel 128, the front face 481 of the rear bracket 480 may have the stepped shape such that the upper end 482 is positioned rearward of the lower end 483.

As the front face 481 of the rear bracket 480 has the stepped shape as above, the rear bracket 480 may be coupled to the first rear panel 118 and the second rear panel 128 and fasten the first rear panel 118 and the second rear panel 128 with each other while allowing a positional difference between the first rear panel 118 and the second rear panel 128, and a support structure for supporting the first rear panel 118 of the first treating apparatus 10 located on the second treating apparatus 20 from the rear may be stably realized.

In one example, referring to FIG. 17, the laundry treating apparatus 1 according to an embodiment of the present disclosure may have a handle 485 on the rear bracket 480. For example, the handle 485 opened downward may be disposed on the lower portion of the rear bracket 480.

The handle 485 may have a shape of a groove that is open downward and recessed upward. The groove of the handle 485 may be defined such that the user may easily grip the handle 485 by putting a finger into the groove.

There may be various positions and shapes of the handle 485, and FIGS. 17 and 18 show the handle 485 that forms a portion of the lower portion of the rear bracket 480 and is opened downward to be gripped by the user, according to an embodiment of the present disclosure.

Although the present disclosure has been illustrated and described in relation to specific embodiments, it is understood that the present disclosure may be variously improved and changed within the scope of the technical idea of the present disclosure provided by the following claims. It will be obvious to those of ordinary skill in the industry.

What is claimed is:

1. A laundry treating system comprising:
   a first treating apparatus comprising:

a first cabinet that comprises (i) a first front panel having a laundry inlet and defining a front face of the first cabinet and (ii) first side panels defining lateral side faces of the first cabinet, and a first drum disposed in the first cabinet and configured to rotate about a first rotating axis extending in a front-rear direction, the first drum being in communication with the laundry inlet and configured to accommodate first laundry therein;

a second treating apparatus comprising:

a second cabinet that comprises (i) a second front panel defining a front face of the second cabinet and (ii) second side panels defining lateral side surfaces of the second cabinet, and a second drum configured to rotate about a second rotating axis extending in the front-rear direction;

a control panel comprising an input unit configured to receive operation commands for the second treating apparatus, wherein an upper end of the second front panel extends higher than an upper end of the second side panels and is configured to support a lower part of the first treating apparatus from a front side of the laundry treating system based on the first treating apparatus being stacked on an upper side of the second treating apparatus and moved forward along the upper side of the second treating apparatus, wherein the upper end of the second front panel is configured to be coupled to the lower part of the first treating apparatus, and wherein the control panel is configured to be inserted between a lower end of the first front panel and the upper end of the second front panel in a state in which the upper end of the second front panel is coupled to the lower part of the first treating apparatus.

2. The laundry treating system of claim 1, wherein the lower end of the first front panel is located above a lower end of each of the first side panels, and wherein a front lower part of each of the first side panels is exposed to the front side of the laundry treating system.

3. The laundry treating system of claim 2, wherein the upper end of the second front panel is configured to be coupled to the front lower part of each of the first side panels.

4. The laundry treating system of claim 2, wherein, in the state in which the first treating apparatus is staked on the second treating apparatus, the lower end of the first front panel is configured to be spaced apart from the upper end of the second front panel to thereby a space between the lower end of the first front panel and the upper end of the second front panel, and wherein the control panel is configured to be inserted into the space from the front side of the laundry treating system to a back side of the laundry treating system.

5. The laundry treating system of claim 1, wherein the lower end of the first front panel is located above a lower end of each of the first side panels, and the lower part of the first treating apparatus has an opening that is opened forward, and wherein the control panel is configured to cover the opening at the lower part of the first treating apparatus from the front side of the laundry treating system.

6. The laundry treating system of claim 1, wherein the second treating apparatus defines:

a detergent opening at the second front panel; and a detergent storage configured to be inserted into the detergent opening, wherein the detergent opening is disposed below the control panel.

7. The laundry treating system of claim 1, wherein a front face is located on a coplanar that extends vertically with a front face of the first front panel and a front face of the second front panel.

8. The laundry treating system of claim 2, further comprising a lower frame that is disposed below the first front panel, and wherein the control panel is configured to be coupled to the lower frame.

9. The laundry treating system of claim 8, wherein the lower frame includes a main frame face that extends in a width direction of the first treating apparatus and that is parallel to a front face of the control panel.

10. The laundry treating system of claim 9, wherein the first treating apparatus further includes (i) a motor that is disposed in the first treating apparatus and configured to drive the first drum and (ii) a signal connection line that is connected to the motor in the first treating apparatus, wherein the lower frame defines a connection hole at the main frame face, the connection hole communicating a front side and a rear side of the main frame face with each other, and wherein the signal connection line extends from an inside of the first treating apparatus and passes through the connection hole, the signal connection line including a connection port that is connected to electric parts of the control panel.

11. The laundry treating system of claim 10, wherein the control panel is connected to the connection port at an outside of the main frame face and inserted into the first front panel and the second front panel.

12. The laundry treating system of claim 9, wherein the main frame face includes a convex portion having (i) a front face that is convex and (ii) a rear face that is concave.

13. The laundry treating system of claim 12, wherein the lower frame further includes an upper end extension that extends forward from an upper end of the main frame face, and wherein the upper end extension extends below the lower end of the first front panel and supports the first front panel.

14. The laundry treating system of claim 13, wherein the convex portion includes the upper end of the main frame face, and wherein the upper end extension extends from an upper end of the convex portion such that a space defined at a rear of the main frame face is opened upward.

15. The laundry treating system of claim 12, wherein the control panel further includes:

a top face that extends rearward from an upper end of the front face of the control panel and is configured to be coupled to the lower end of the first front panel; and a bottom face that extends rearward from a lower end of the front face of the control panel and is configured to be coupled to the upper end of the second front panel.

16. The laundry treating system of claim 13, wherein the control panel further includes:

a top face that extends rearward from an upper end of the front face of the control panel; and a bottom face that extends rearward from a lower end of the front face of the control panel, wherein the lower end of the first front panel and the upper end extension is spaced apart from each other, and wherein the top face is inserted into the lower end of the first front panel and the upper end extension.

17. The laundry treating system of claim 1, further comprising:
an upper frame that is disposed at a front upper part of the second treating apparatus and that couples a front side of the first treating apparatus and a front side of the second treating apparatus by an insulating connection member including an insulating material.

18. The laundry treating system of claim 17, wherein a portion of the upper frame is fixed to the second treating apparatus, and
wherein another portion of the upper frame extends upward and is coupled to the lower part of the first treating apparatus.

19. The laundry treating system of claim 18, wherein the first front panel includes a lower end bending portion that defines the lower end of the first front panel and that extends rearward from a lower end of a front face of the first front panel,
wherein the second front panel includes an upper bending portion that defines the upper end of the second front panel and that extends rearward from an upper end of a front face of the second front panel,
wherein the portion of the upper frame is coupled to the second side panels between the second front panel and the second side panels, and
wherein the another portion of the upper frame extends upward relative to the upper bending portion and is coupled to the front side of the first treating apparatus.

20. The laundry treating system of claim 19, wherein the second front panel further comprises an upper fastening portion that extends upward from the upper bending portion,
wherein the upper frame has a plate shape that is parallel to the front face of the second front panel, and
wherein the another portion of the upper frame is coupled to the first side panels together with the upper fastening portion.

21. The laundry treating system of claim 18, wherein the insulating connection member is coupled to the first side panels, and
wherein the another portion of the upper frame is coupled to the insulating connection member and electrically insulates the second side panels from the first side panels.

22. A laundry treating system comprising:
a first treating apparatus including:
a first cabinet that comprises (i) a first front panel having a laundry inlet and defining a front face of the first cabinet and (ii) first side panels defining lateral side faces of the first cabinet, and
a first drum disposed in the first cabinet and configured to rotate about a first rotating axis extending in a front-rear direction, the first drum being in communication with the laundry inlet and configured to accommodate first laundry therein;
a second treating apparatus including:
a second cabinet that comprises (i) a second front panel defining a front face of the second cabinet and (ii) second side panels defining lateral side faces of the second cabinet, and
a second drum configured to rotate about a second rotating axis extending in the front-rear direction; and
a control panel comprising an input unit that is configured to receive operation commands for the first treating apparatus and the second treating apparatus,
wherein an upper end of the second front panel extends higher than an upper end of the second side panels and is configured to support a lower part of the first treating apparatus from a front side of the laundry treating system based on the first treating apparatus being stacked on an upper side of the second treating apparatus,
wherein the upper end of the second front panel is configured to be coupled to the lower part of the first treating apparatus, and
wherein the control panel is configured to be inserted between a lower end of the first front panel and the upper end of the second front panel in a state in which the upper end of the second front panel is coupled to the lower part of the first treating apparatus.

23. The laundry treating system of claim 22, further comprising:
an upper frame that is disposed at a front upper part of the second treating apparatus and that couples a front side of the first treating apparatus and a front side of the second treating apparatus by an insulating connection member including an insulating material,
wherein the upper frame has (i) a first side that is fixed to the second treating apparatus and (ii) a second side that extends upward and is coupled to the lower part of the first treating apparatus.

24. The laundry treating system of claim 23, wherein the second front panel includes an upper bending portion that defines the upper end of the second front panel and that extends rearward from an upper end of a front face of the second front panel,
wherein the second front panel further comprises an upper fastening portion that extends upward from the upper bending portion,
wherein the upper frame has a plate shape that is parallel to the front face of the second front panel,
wherein the first side is coupled to the second side panels between the second front panel and the second side panels, and
wherein the second side of the upper frame is coupled to the first side panels together with the upper fastening portion.

* * * * *